US007497209B2

(12) United States Patent
Annoura

(10) Patent No.: US 7,497,209 B2
(45) **Date of Patent: *Mar. 3, 2009**

(54) FUEL VAPOR TREATMENT SYSTEM FOR INTERNAL COMBUSTION ENGINE

(75) Inventor: Toshiki Annoura, Nagoya (JP)

(73) Assignee: DENSO Corporation, Kariya (JP)

( * ) Notice: Subject to any disclaimer, the term of this patent is extended or adjusted under 35 U.S.C. 154(b) by 8 days.

This patent is subject to a terminal disclaimer.

(21) Appl. No.: 11/703,703

(22) Filed: Feb. 8, 2007

(65) Prior Publication Data

US 2007/0199372 A1 Aug. 30, 2007

(30) Foreign Application Priority Data

Feb. 27, 2006 (JP) ............................ 2006-051178

(51) Int. Cl.
*F02M 33/02* (2006.01)
*G05D 1/00* (2006.01)

(52) U.S. Cl. ........................ 123/520; 123/575; 701/104

(58) Field of Classification Search ................. 123/520, 123/698, 674; 701/104
See application file for complete search history.

(56) References Cited

U.S. PATENT DOCUMENTS 5,462,034 A * 10/1995 Kadota ....................... 123/520
6,971,375 B2 12/2005 Amano et al.
7,233,845 B2 * 6/2007 Veinotte ...................... 701/29
2006/0042605 A1 3/2006 Amano et al.
2006/0225714 A1 10/2006 Kano et al.
2007/0157908 A1 7/2007 Kano et al.

FOREIGN PATENT DOCUMENTS

JP 7-269419 10/1995

* cited by examiner

*Primary Examiner*—Stephen K Cronin
*Assistant Examiner*—Keith Coleman
(74) *Attorney, Agent, or Firm*—Nixon & Vanderhye P.C.

(57) ABSTRACT

A fuel vapor treatment system is disclosed for a vehicle engine having a leak check device. When a leak is not detected by the leak check device and when a leak is detected but it is determined by a reliability determining device that fuel status determined by a second fuel status determining device is reliable, an air-fuel ratio controlling device switches which to use, a fuel status determined by a first fuel status determining device or a fuel status determined by the second fuel status determining device, based on the operating state of the vehicle. Also, when it is determined by the reliability determining device that the fuel status determined by the second fuel status determining device is unreliable, the air-fuel ratio controlling device uses the fuel status determined by the first fuel status determining device for the fuel status for controlling injection quantity regardless of vehicle operating state.

9 Claims, 15 Drawing Sheets

FIG. 17
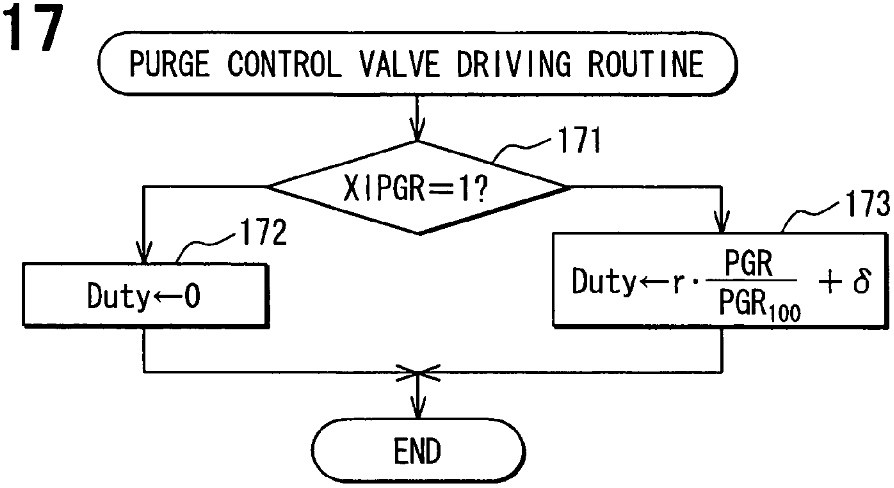
FIG. 18
| TA / Ne | 38 | 49 | 59 | 69 | 79 | 86 | 100% |
|---|---|---|---|---|---|---|---|
| 800 | 20.1 | 14.5 | 11.2 | 8.6 | 6.2 | 4.6 | 0.0 |
| 1200 | 12.5 | 9.3 | 7.2 | 5.5 | 4.0 | 2.9 | 0.0 |
| 1600 | 9.3 | 6.8 | 5.3 | 4.0 | 2.9 | 2.1 | 0.0 |
| 2000 | 7.9 | 5.7 | 4.4 | 3.3 | 2.4 | 1.8 | 0.0 |
| 2400 | 6.0 | 4.5 | 3.5 | 2.6 | 1.9 | 1.4 | 0.0 |
| 2800 | 5.5 | 4.1 | 3.1 | 2.3 | 1.7 | 1.2 | 0.0 |
| 3200 | 4.9 | 3.6 | 2.7 | 2.0 | 1.5 | 1.1 | 0.0 |
| 3600 | 4.1 | 3.0 | 2.2 | 1.7 | 1.3 | 0.9 | 0.0 |
| 4000 | 3.4 | 2.4 | 1.8 | 1.4 | 1.1 | 0.8 | 0.0 |
FIG. 20
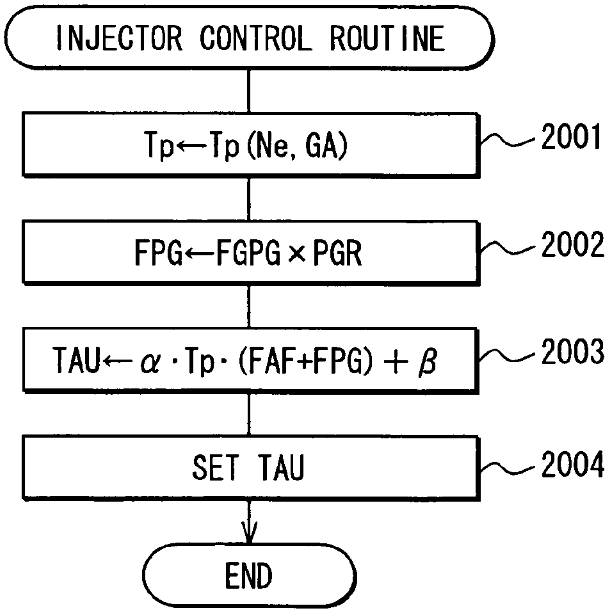

FUEL VAPOR TREATMENT SYSTEM FOR INTERNAL COMBUSTION ENGINE

CROSS REFERENCE TO RELATED APPLICATION

The following is based on and claims priority to Japanese Patent Application No. 2006-51178, filed Feb. 27, 2006, and is hereby incorporated by reference in its entirety.

FIELD

The following relates to a fuel vapor treatment system for an internal combustion engine.

BACKGROUND

Fuel vapor treatment systems are known for reducing fuel vapor produced in a fuel tank from dissipating into the atmosphere. They are so constructed that fuel vapor in a fuel tank is introduced into a canister containing an adsorbent. When the internal combustion engine is operated, fuel vapor adsorbed by the adsorbent flows away from the adsorbent due to negative pressure in an intake pipe. The fuel vapor is discharged (i.e., purged) into the intake pipe of the internal combustion engine through a purge pipe. When the fuel vapor is purged, the adsorbing capability of the adsorbent is restored.

When fuel vapor is being purged, it is typically necessary to control the air-fuel ratio of air-fuel mixture introduced into the internal combustion engine to ensure the air-fuel ratio is approximately equal to a target air-fuel ratio (a theoretical air-fuel ratio in general cases). Consequently, there have been proposed technologies for implementing an air-fuel ratio sensor for measuring air-fuel ratio. The air-fuel ratio sensor is provided in the exhaust pipe of an internal combustion engine. Feedback control is carried out based on an amount of deviation between an air-fuel ratio measured by the air-fuel ratio sensor and a target air-fuel ratio. Injection quantity is thereby controlled so that the air-fuel ratio of air-fuel mixture introduced into the internal combustion engine is approximately equal to the target air-fuel ratio. (Refer to JP-A-7-269419, for example.)

The apparatus disclosed in JP-A-7-269419 is so constructed that an amount of deviation between the air-fuel ratio and the target air-fuel ratio is measured with an air-fuel ratio sensor. Based on the measured amount of deviation, a state of the fuel vapor concentration of air-fuel mixture containing fuel vapor purged from the canister is determined. Thus, fuel vapor concentration is a kind of fuel status. Based on the determined fuel vapor concentration (i.e., fuel status), injection quantity is controlled such that the air-fuel ratio becomes approximately equal to the target air-fuel ratio.

In the apparatus disclosed in JP-A-7-269419, air-fuel ratio is measured with an air-fuel ratio sensor, and deviation between the measured air-fuel ratio and target air-fuel ratio is fed back to determine an injection quantity. Thus, injection quantity cannot be determined unless purging is carried out.

When purging is started, therefore, it is typically required to select a relatively low purge rate so that air-fuel ratio does not substantially fluctuate and to gradually increase the purge rate. Furthermore, when purging is resumed after interruption, it is typically required to lower the initial purge rate and gradually increase it. For this reason, a problem arises. An amount of purge cannot be sufficiently increased.

SUMMARY

A fuel vapor treatment system is disclosed for an internal combustion engine of a vehicle having a leak check device in which a space extending from a fuel tank to a canister for temporarily adsorbing fuel vapor produced in the fuel tank to a point at which the fuel vapor is purged into an intake pipe of the internal combustion engine is defined as a leak check closed space for checking for a leak of at least a predetermined size based on change in pressure in the leak check closed space. The fuel vapor treatment system includes a purge pipe for guiding fuel vapor purged from the canister into the intake pipe. The fuel vapor treatment system also includes a purge control valve operatively coupled to the purge pipe for controlling the rate of a purge flow from the purge pipe to the intake pipe. Furthermore, the fuel vapor treatment system includes an air-fuel ratio sensor operatively coupled to an exhaust pipe of the internal combustion engine for detecting an air-fuel ratio. Also, the fuel vapor treatment system includes a first fuel status determining device that determines the fuel status of an air-fuel mixture containing fuel vapor purged from the canister based on an amount of deviation between the air-fuel ratio detected by the air-fuel ratio sensor and a target air-fuel ratio when the purge control valve is open. Moreover, the fuel vapor treatment system includes an air-fuel ratio controlling device that controls the quantity of injection into the internal combustion engine so that the air-fuel ratio becomes substantially equal to the target air-fuel ratio based on the fuel status of air-fuel mixture purged from the canister. In addition, the fuel vapor treatment system includes an air-fuel mixture circulation portion with a first component portion forming part of a closed space formation portion that forms the leak check closed space and a second component portion separate from the closed space formation portion but that communicates with the first component portion, and through which the air-fuel mixture purged from the canister can flow with the purge control valve closed. Furthermore, the fuel vapor treatment system includes a second fuel status determining device that purges the air-fuel mixture from the canister into the air-fuel mixture circulation portion with the purge control valve closed and thereby determines the fuel status of the air-fuel mixture. Additionally, the fuel vapor treatment system includes a reliability determining device that, when the presence of a leak is detected by the leak check device, determines the reliability of the fuel status determined by the second fuel status determining device based on a comparison of the fuel status of air-fuel mixture determined by the first fuel status determining device and the fuel status of air-fuel mixture determined by the second fuel status determining device. When a leak is not detected by the leak check device and when a leak is detected but it is determined by the reliability determining device that the fuel status determined by the second fuel status determining device is reliable, the air-fuel ratio controlling device switches which to use, the fuel status determined by the first fuel status determining device or the fuel status determined by the second fuel status determining device, based on the operating state of the relevant vehicle. When it is determined by the reliability determining device that the fuel status determined by the second fuel status determining device is unreliable, the air-fuel ratio controlling device uses the fuel status determined by the first fuel status determining device for the fuel status for controlling the injection quantity regardless of the operating state of the vehicle.

BRIEF DESCRIPTION OF THE DRAWINGS

FIG. 17 is a flowchart illustrating a purge control valve driving routine;

FIG. 18 is one embodiment of a setting of a map for determining a full open purge rate;

FIG. 20 is a flowchart illustrating an injector control routine;

DETAILED DESCRIPTION OF THE PREFERRED EMBODIMENTS

Figure 1:
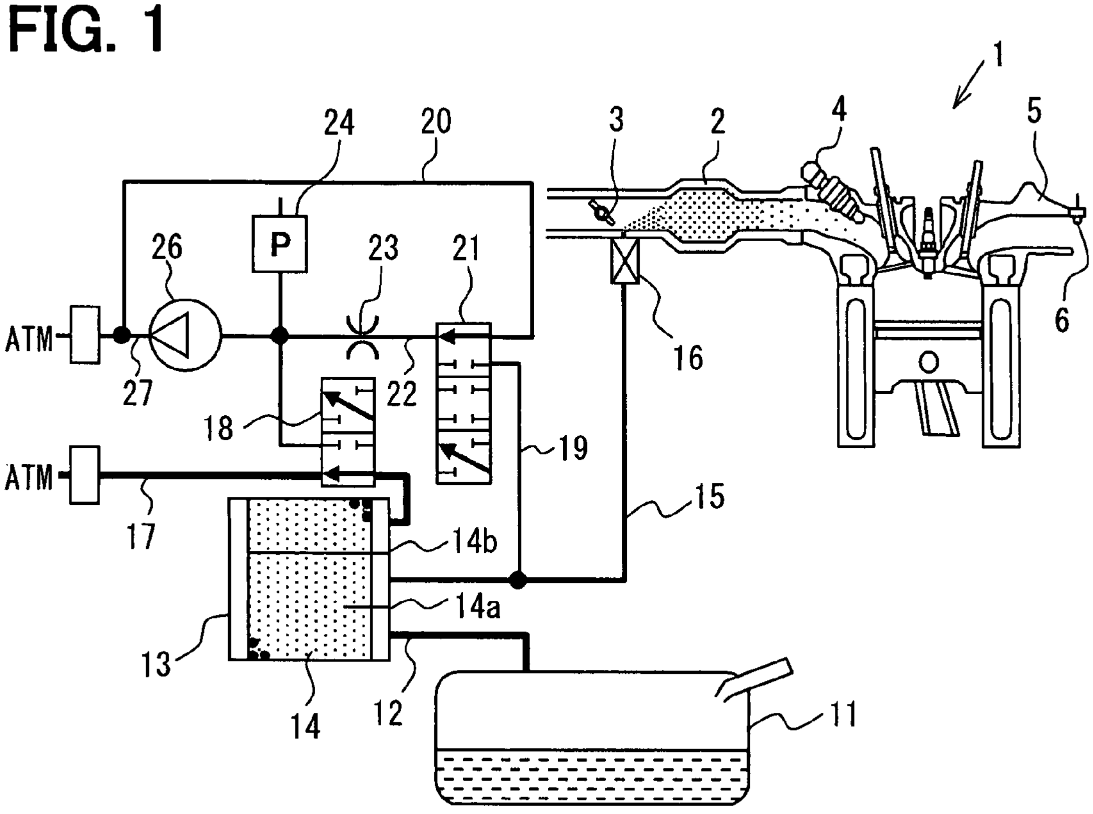
FIG. 1 is a schematic diagram illustrating one embodiment of a fuel vapor treatment system according to the present disclosure.

Hereafter, description will be given to preferred embodiments of the invention. Referring initially to FIG. 1, a block diagram of one embodiment of a fuel vapor treatment system is shown. The fuel vapor treatment system in this embodiment is applied to, for example, a vehicle engine (e.g., automobile engine). The fuel tank 11 of an engine 1 (e.g., an internal combustion engine) is connected to a canister 13 through an evapo line 12 (i.e., a vapor introducing pipe).

The canister 13 is filled with adsorbent 14, and fuel vapor produced in the fuel tank 11 is temporarily adsorbed in the adsorbent 14. The canister 13 is connected with the intake pipe 2 of the engine 1 through a purge line 15 (i.e., a purge pipe). A purge valve 16 (i.e., a purge control valve) is operatively coupled to the purge line 15. The canister 13 and the intake pipe 2 communicate with each other when the purge valve 16 is open.

The canister 13 is provided therein with diaphragms 14*a*, 14*b*. The diaphragm 14*a* is provided between the point of connection with an evapo line 12 and the point of connection with the purge line 15. The diaphragm 14*a* inhibits fuel vapor introduced from the evapo line 12 from being discharged from the purge line 15 without being adsorbed into the adsorbent 14.

As described later, the canister 13 is also in communication with an atmosphere line 17. The other diaphragm 14*b* is provided at substantially the same depth as the filling depth of the adsorbent 14 between the point of connection with the atmosphere line 17 and the point of connection with the purge line 15. The diaphragm 14*b* inhibits vapor introduced from the evapo line 12 from being discharged from the atmosphere line 17.

In one embodiment, the purge valve 16 is an electromagnetic valve, and its opening is adjusted by an electronic control unit (not shown) that controls various parts of the engine 1. The flow rate of air-fuel mixture containing fuel vapor flowing in the purge line 15 is controlled by the opening of the purge valve 16. The air-fuel mixture is purged into the intake pipe 2 by the negative pressure in the intake pipe 2 produced by a throttle valve 3, and is burned together with injected fuel from an injector 4. (Hereafter, the air-fuel mixture containing purged fuel vapor will be referred to as purged gas as appropriate).

The canister 13 is connected with the atmosphere line 17 whose end is open to the atmosphere through a filter. The atmosphere line 17 is provided with a switching valve 18 that causes the canister 13 to communicate with either the atmosphere line 17 or the inlet side of a pump 26. When the switching valve 18 is not driven by the electronic control unit, it is in a first position in which it causes the canister 13 to communicate with the atmosphere line 17. When the switching valve is driven, it is shifted to a second position in which it causes the canister 13 to communicate with the inlet side of the pump 26.

A branch line 19 branched from the purge line 15 is connected to one input port of a three-position valve 21. The other input port of the three-position valve 21 is connected with an air supply line 20 branched from the discharge line 27 of the pump 26 that is open to the atmosphere through a filter. The output port of the three-position valve 21 is connected with a measurement line 22 (i.e., measurement passage). The three-position valve 21 is a measurement passage switching device, and its position is switched to any of three positions by the electronic control unit. More specifically, in a first position of the valve 21, the air supply line 20 is connected to (i.e., communicates with) the measurement line 22. In a second position, the measurement line 22 is disconnected from the air supply line 20 and the branch line 19. In a third position, the branch line 19 is connected to the measurement line 22. The three-position valve 21 is biased toward the first position such that when the valve 21 is not driven, the valve 21 is set in the first position.

The measurement line 22 is provided with a throttle 23 composed of an orifice and the pump 26. The pump 26 (i.e., a gas flow producing device) is a motor pump in one embodiment. When driven, the pump 26 causes gas to flow to the measurement line 22 with the throttle 23 side as the inlet side. The activation, deactivation, and number of revolutions of the pump 26 are controlled by the electronic control unit. The electronic control unit drives the pump 26 and carries out control so that the number of pump revolutions is constant at a predetermined value.

Therefore, when the switching valve 18 is kept in the first position and the electronic control unit drives the pump 26 with the three-position valve 21 set in the first position, a "first measurement state" is established. In this state, air flows in the measurement line 22. When the pump 26 is driven with the three-position valve 21 set in the third position, a "second measurement state" is established. In this state, air-fuel mixture containing fuel vapor supplied through the atmosphere line 17, the canister 13, part of the purge line 15 extending to the branch line 19, and the branch line 19 flows in the measurement line 22.

In the measurement line 22, there is provided a pressure sensor 24 as a pressure measuring device, one end of which is connected downstream of the throttle 23 (i.e., between the throttle 23 and the pump 26). The other end of the pressure sensor 24 is open to the atmosphere, and the differential pressure between the atmospheric pressure and the pressure in the portion of the measurement line 22 positioned downstream of the throttle 23 is detected by the pressure sensor 24. The pressure measured by the pressure sensor 24 is outputted to the electronic control unit.

The electronic control unit controls the following based on detection values detected by various sensors: the opening of the throttle valve 3 that is provided in the intake pipe 2 for adjusting intake air quantity; a quantity of injection from an injector 4; the opening of the purge valve 16; and the like. For example, the electronic control unit controls a throttle opening, an injection quantity, the opening of the purge valve 16, and the like based on the following: an intake air quantity detected by an air flow sensor (not shown) provided in the intake pipe 2 and an intake pressure detected by an intake pressure sensor (not shown); an air-fuel ratio detected by an air-fuel ratio sensor 6 provided in the exhaust pipe 5; an ignition signal; a number of engine revolutions; an engine cooling water temperature; an accelerator opening; and the like.

Figure 2:
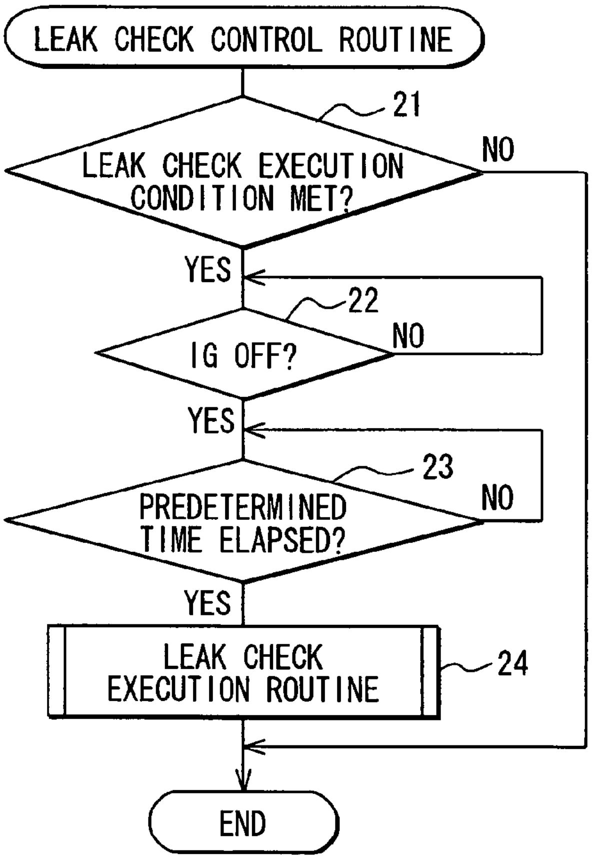
FIG. 2 is a flowchart illustrating a leak check control routine carried out in a fuel vapor treatment system.

More description will now be given to the control by the electronic control unit. FIG. 2 is a flowchart illustrating leak check control carried out in the fuel vapor treatment system. In this embodiment, the process illustrated in FIG. 2 corresponds to a leak determining device. In this process, the three-position valve 21 and the switching valve 18 function as a pressure application range switching device, the measurement line 22 functions as a leak check passage, and the pump 26 functions as a pressure applying device.

At Step 21, it is determined whether or not a leak check execution condition has been met. In one embodiment, the leak check execution condition is met when the vehicle operates for at least a predetermined amount of time or the ambient temperature is at least a predetermined value. In cases where a negative determination is made at Step 21, the routine is terminated. In cases where an affirmative determination is made at Step 21, it is determined at Step 22 whether or not the ignition is off. In cases where a negative determination is made at Step 22, the processing of Step 22 is repeated until the ignition is turned off.

Step 23 follows in cases in which it is determined that the ignition is off at Step 22, and it is determined whether or not a predetermined time has elapsed after the ignition was turned off. The processing of Step 23 is carried out because fuel in the fuel tank 11 is likely to be moving around and/or the fuel temperature is unstable immediately after the ignition is turned off. For this reason, the pressure in the fuel vapor treatment system is likely to be unstable and unsuitable for carrying out leakage diagnosis and anomaly diagnosis. Therefore, these diagnoses are prevented from being carried out. In one embodiment, the predetermined time of Step 23 is preset to a time it takes for the interior of the fuel vapor treatment system, which is in an unstable state immediately after the ignition is turned off, to be stabilized to a level at which leakage diagnosis can be accurately carried out. In cases where a negative determination is made at Step 23, the processing of Step 23 is repeated. When the predetermined time has elapsed and an affirmative determination is made at Step 23, an anomaly diagnosis is carried out at Step 24, and thereafter the leak check control routine is terminated.

Figure 3:
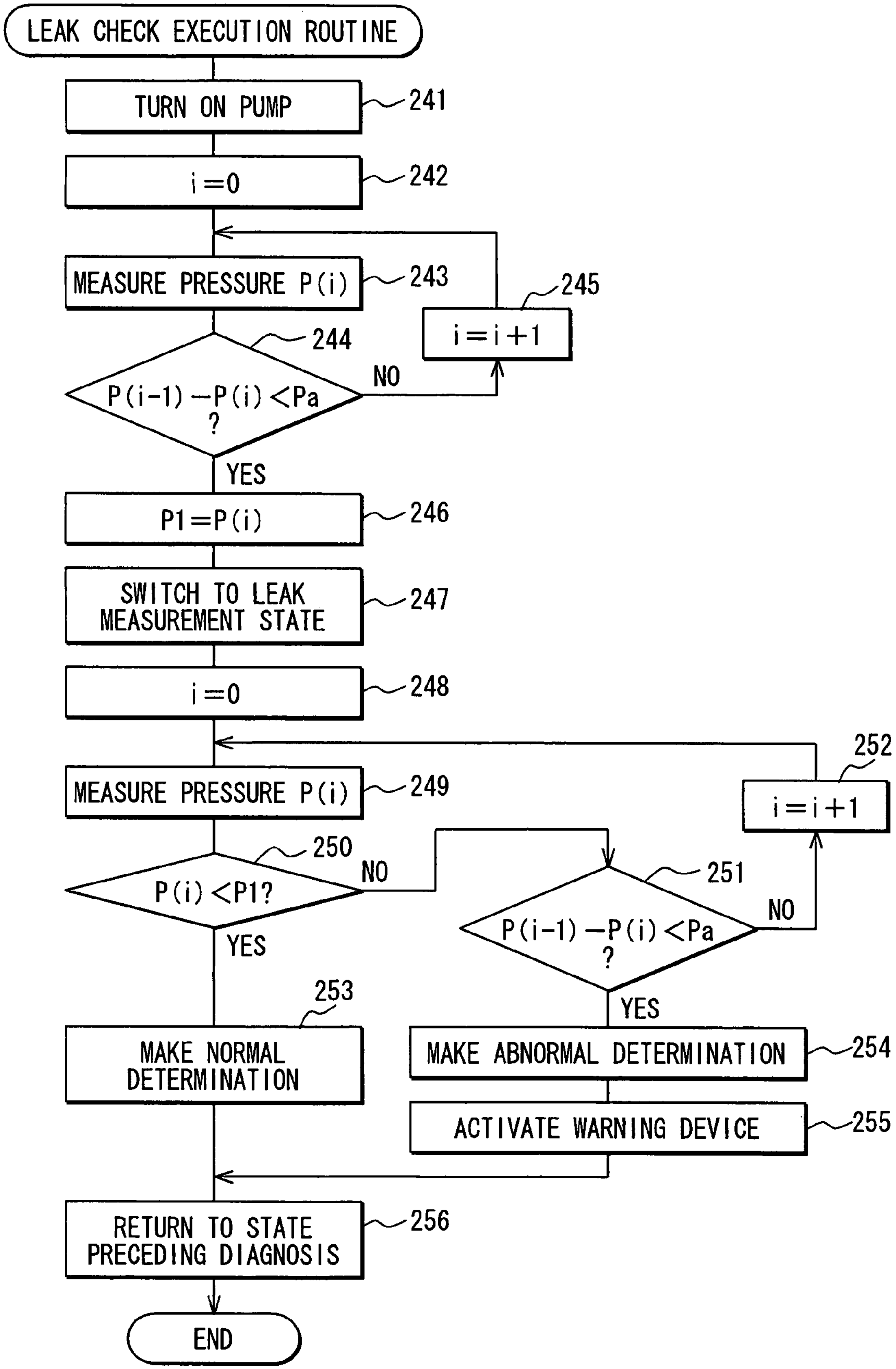
FIG. 3 is a flowchart illustrating a leak check execution routine of the leak check control routine of FIG. 2.

FIG. 3 illustrates a leak check execution routine. When the leak check execution routine is started, the three-position valve 21 is in the first position, and the switching valve 18 is also in the first position. At this time, the pressure detected by the pressure sensor 24 as a differential pressure sensor is 0.

Figure 4:
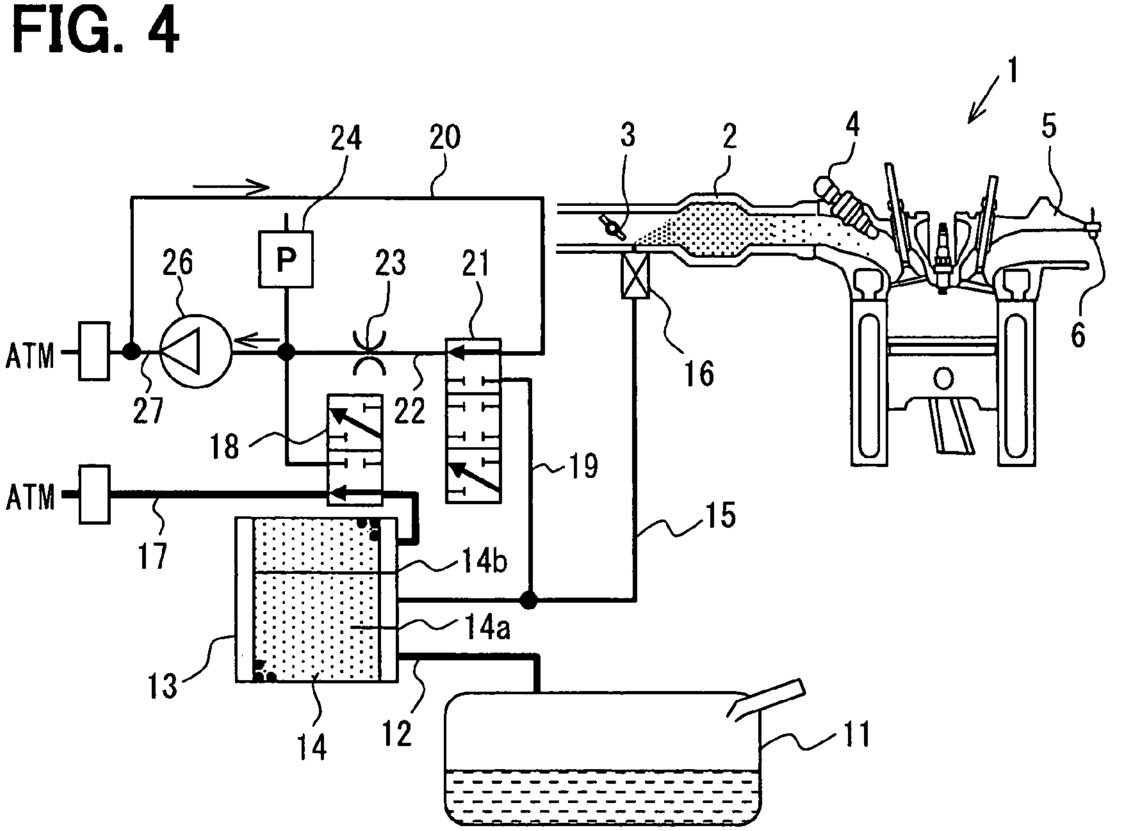
FIG. 4 is a schematic diagram illustrating the state of gas circulation established when Step 241 of FIG. 3 is carried out.

At Step 241, the pump 26 is turned on. FIG. 4 illustrates the state of gas circulation established at this time. The state illustrated in FIG. 4 is identical with the first measurement state mentioned above. As illustrated in FIG. 4, the three-position valve 21 is in the first position at Step 241; therefore, the air supply line 20 communicating with the atmosphere communicates with the measurement line 22. The switching valve 18 is in the first position; therefore, the canister 13 and the pump 26 do not communicate with each other. As a result, the fuel vapor treatment system is in the air circulating state in which air flows in the measurement line 22, and the pressure detected by the pressure sensor 24 is equivalent to an amount of the air pressure lowered by the throttle 23.

At Step 242, the variable "i" is set to zero. Then, in Step 243, the pressure detected by the pressure sensor 24 is set to be P(i) and measured. At Step 244, the variation $P(i-1)-P(i)$ from the immediately previous measured pressure $P(i-1)$ to the new measured pressure P(i) is compared with a threshold value Pa to determine whether $P(i-1)-P(i)<Pa$.

In cases where a negative determination is made at Step 244, the variable "i" is incremented by one at Step 245, and the process returns to Step 243. In cases where an affirmative determination is made at Step 244, the flow proceeds to Step 246. The above-mentioned measure is taken because the measured pressure largely varies when the pump 26 is started and thereafter gradually settles into the pressure value defined by the sectional area of the passage in the throttle 23 and the like. Therefore, the measured pressure is allowed to sufficiently settle before the processing of Step 246 and the following steps are carried out.

Figure 5:
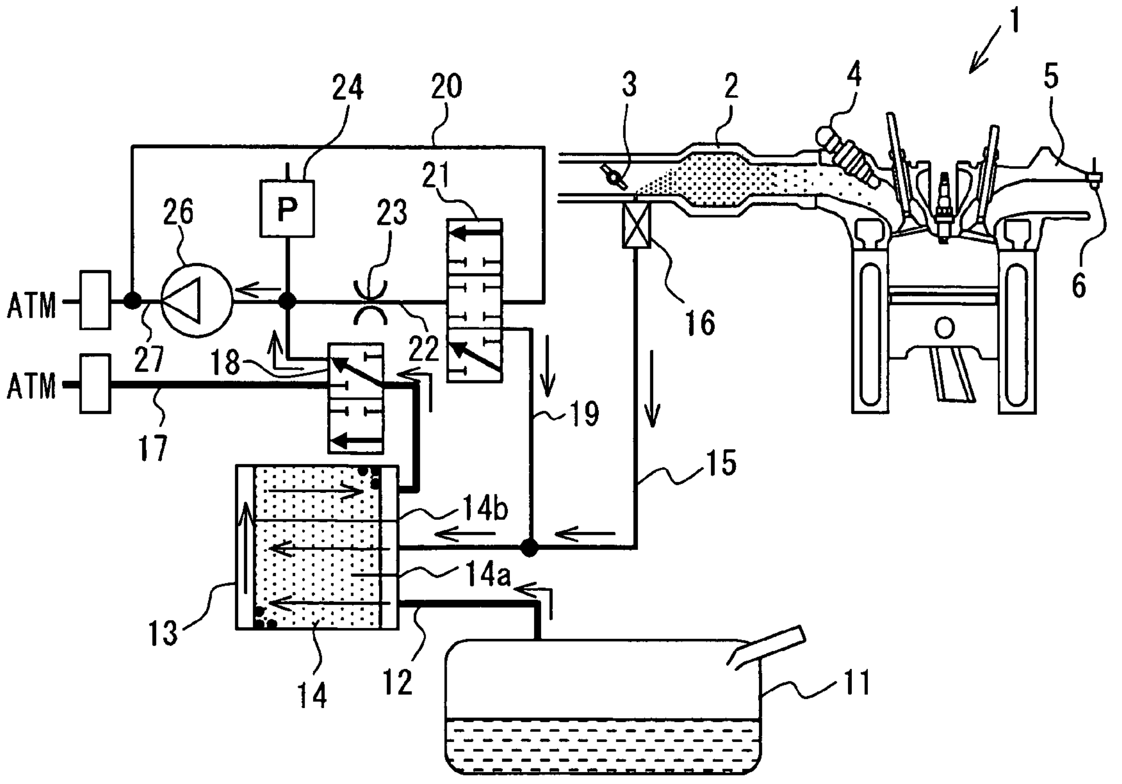
FIG. 5 is a schematic diagram illustrating the state of gas circulation established when Step 247 of FIG. 3 is carried out.

At Step 246, P(i) is substituted for reference pressure P1. At Step 247, a leak measurement state is established. This leak measurement state is the state illustrated in FIG. 5, and in this state, the three-position valve 21 is turned to the second position and the switching valve 18 is turned to the second position. When leak check is executed, the ignition is off; therefore, the purge valve 16 is closed as well.

In the leak measurement state, the fuel tank 11, evapo line 12, canister 13, purge line 15, branch line 19, and the section from the canister 13 to the pump 26 by way of the switching valve 18 are defined as a closed space. This closed space is equivalent to the leak check closed space, and the above-mentioned members that form the leak check closed space are equivalent to the closed space formation portion. When gas in this leak check closed space is discharged into the atmosphere by the pump 26, the pressure in the leak check closed space is reduced.

The processing of Steps 248 to 255 is for comparing the measured pressure with the reference pressure P1 and thereby determining whether or not any leak exists in the leak check closed space. Without a leak in the leak check closed space, the pressure into which the reduced pressure in the leak check closed space settles is defined by the opening area of the throttle 23. In cases where a leak exists in the leak check closed space, a perfect closed space does not exist; therefore, the pressure does not reach the reference pressure P1. For this reason, the presence or absence of a leak in the leak check closed space can be checked by comparing the measured pressure with the reference pressure P1.

At Step 248, the variable "i" is set to 0. At Step 249, the pressure P(i) is measured, and at Step 250, the measured pressure P(i) is compared with the reference pressure P1 to determine whether or not P(i)<P1. When an affirmative determination is made at this step, the flow proceeds to Step 253. When a negative determination is made, Step 254 follows. In the early stages after the leak measurement state is established, usually, the measured pressure P(i) has not reached the reference pressure P1, and the determination made at Step 250 is negative.

In cases where a negative determination is made at Step 250, the flow proceeds to Step 251. The processing of Steps 251 and 252 is intended to attain the purpose of the processing of Steps 244 and 245. At Step 251, the variation P(i−1)−P(i) from the immediately previous measured pressure P(i−1) to the new measured pressure P(i) is compared with the threshold value Pa to determine whether P(i−1)−P(i)<Pa. When a negative determination is made at this step, the variable "i" is incremented by one at Step 252 and the flow returns to Step 249. In cases where an affirmative determination is made at Step 251, the flow proceeds to Step 254. The purpose of the processing of Step 251 is to wait until the measured pressure P(i) settles similar to Step 244 explained above.

At Step 253, it is determined that the interior of the leak check closed space is normal (i.e., a leak does not exist). At Step 254, it is determined that there is an anomaly in the leak check closed space. In cases it is revealed by these steps of processing that a leak larger than the throttle 23 exists in the leak check closed space, and an abnormal determination is made.

In cases where the processing of Step 253 is carried out and a normal determination is made, the flow proceeds to Step 256. In cases where the processing of Step 254 is carried out and an abnormal determination is made, the processing of Step 255 is carried out to activate a warning device, and then the flow proceeds to Step 256. The warning device is, for example, an indicator provided on the instrument panel of the vehicle.

At Step 256, the pump 26 is turned off, and both the three-position valve 21 and the switching valve 18 are turned to the first position. Thus, the fuel vapor treatment system is returned to the state in which it was before the leak check was executed.

Figure 6:
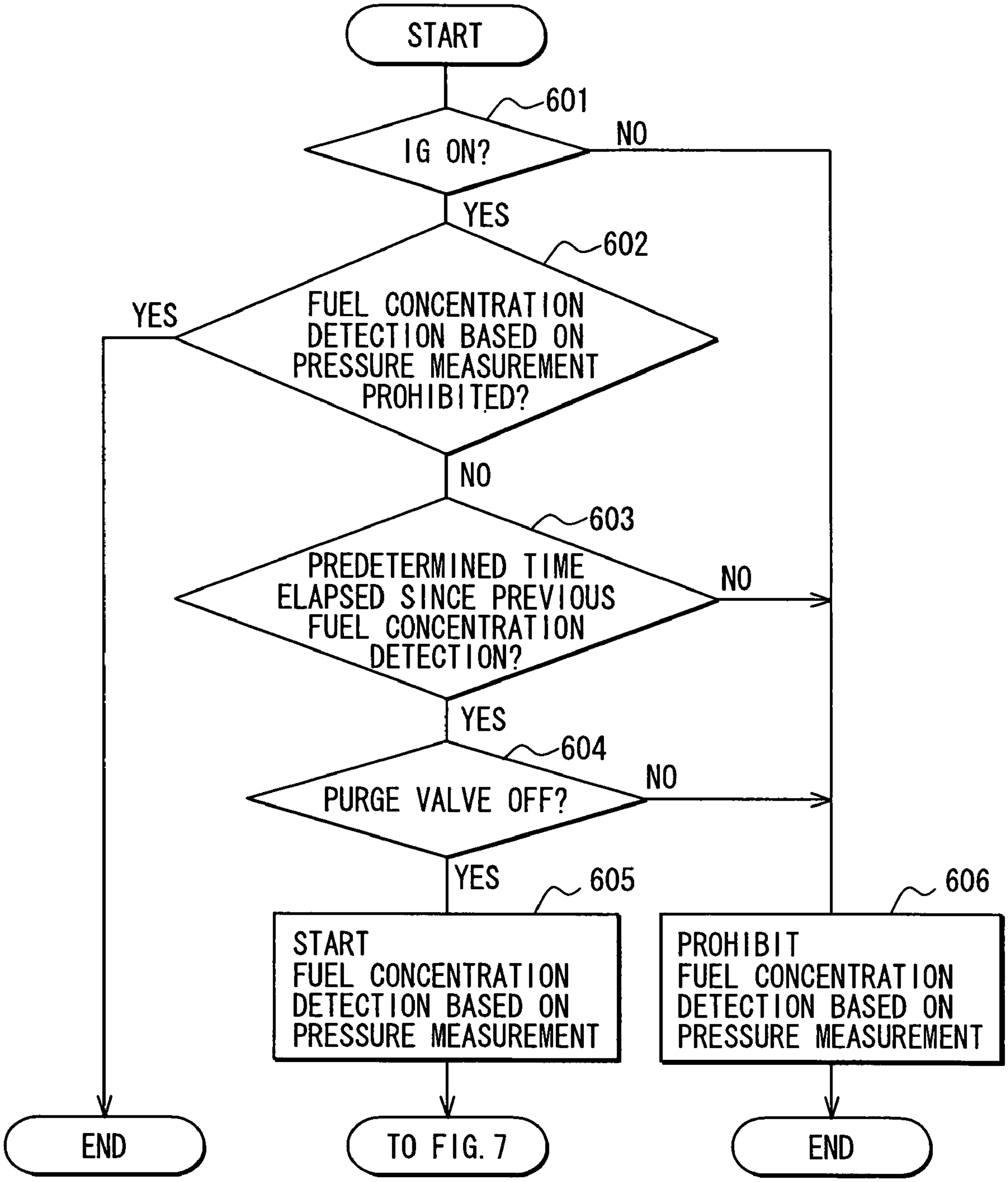
FIG. 6 is a flowchart illustrating a fuel concentration determination routine for determining the concentration of fuel vapor for the fuel vapor treatment system.

FIG. 6 is a flowchart of a fuel concentration determination routine for determining the concentration of fuel vapor contained in purged gas purged from the canister 13, and is carried out at predetermined, relatively short intervals.

At Step 601, it is determined whether or not the ignition switch is on. In cases where this determination is negative, the engine 1 has not started yet, and thus purge control is not carried out. At Step 606, therefore, it is determined that concentration detection based on pressure measurement (FIG. 7) will be prohibited, and this routine is terminated.

Figure 21:
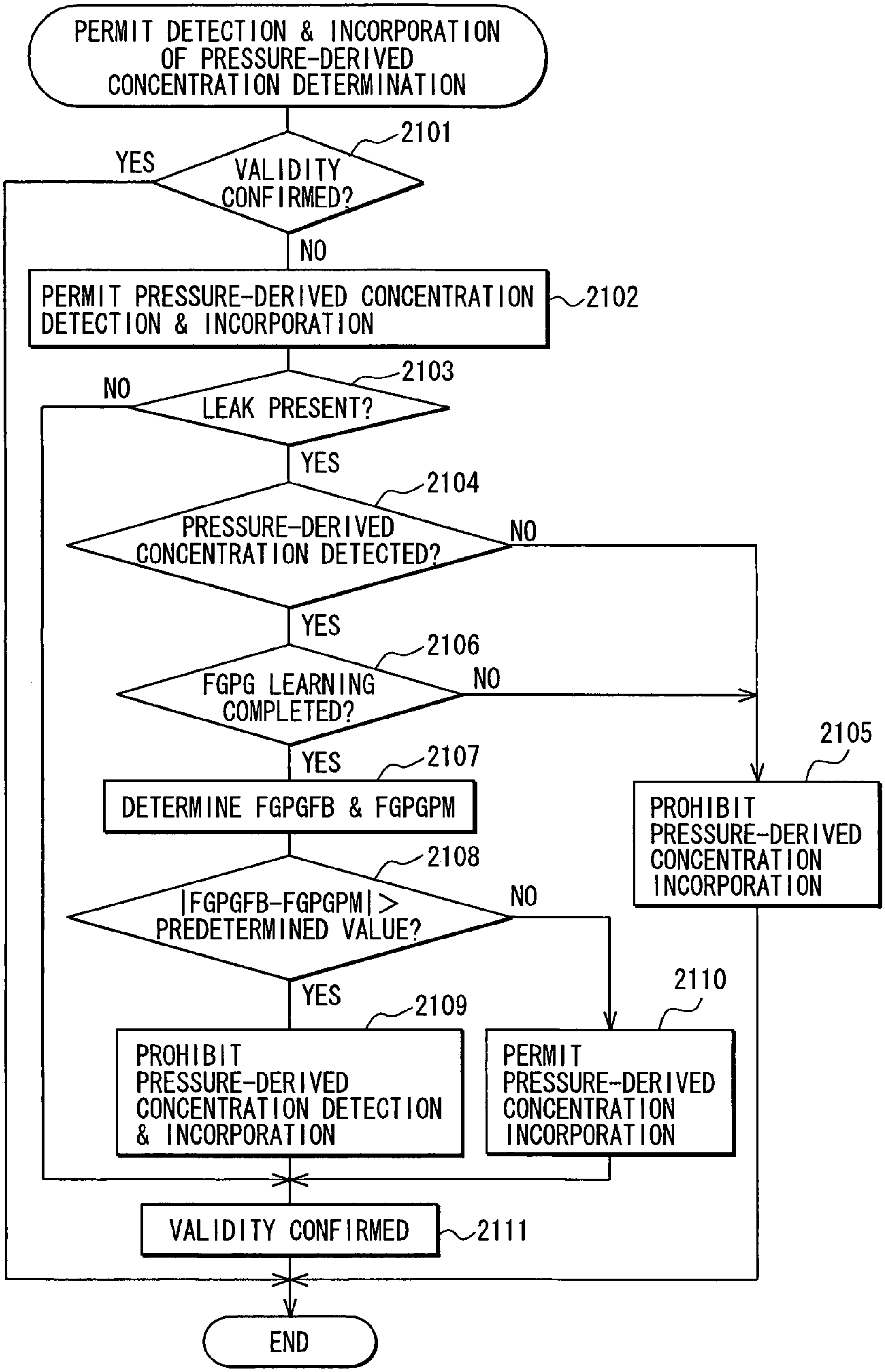
FIG. 21 is a flowchart illustrating a pressure-derived concentration detection and incorporation permission routine.

In cases where an affirmative determination is made at Step 601, the processing of Step 602 is carried out. In Step 602, it is determined whether or not fuel concentration detection based on pressure measurement has been prohibited in a routine for determining whether to permit the detection and incorporation of pressure-derived concentration, described later (FIG. 21). In cases where the determination made at Step 602 is affirmative, the routine is terminated.

In cases where a negative determination is made at Step 602, that is, fuel concentration detection based on pressure measurement has not been prohibited, Step 603 follows. At Step 603, it is determined whether or not a predetermined time has elapsed since the previous fuel concentration detection based on pressure measurement, that is, the fuel concentration detection according to FIG. 7, described later. In cases where a negative determination is made at Step 603, the above-mentioned processing of Step 606 is carried out.

In cases where an affirmative determination is made at Step 603, it is further determined at Step 604 whether or not the purge valve 16 is off (i.e., fully closed). Also, in cases where a negative determination is made at Step 604, that is, the purge valve 16 is open, the above-mentioned processing of Step 606 is carried out.

Figure 7:
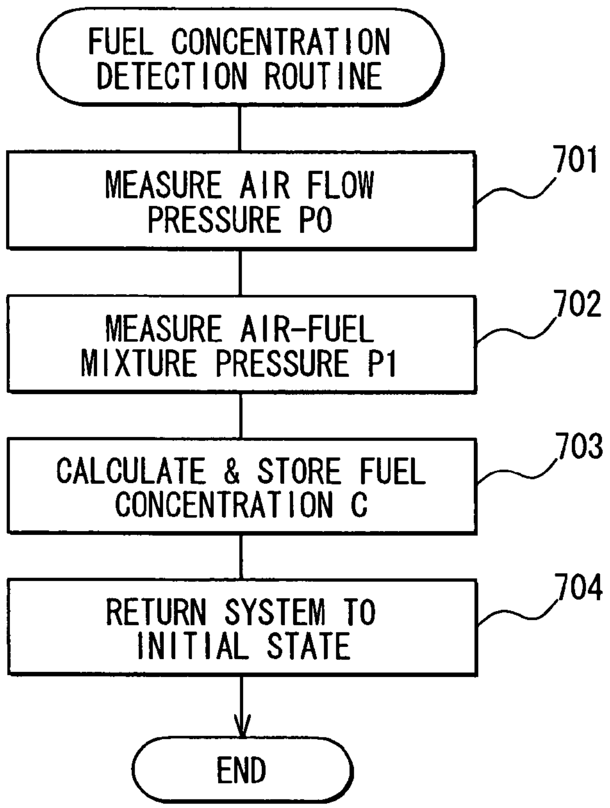
FIG. 7 is a flowchart illustrating a concentration detection routine for detecting a fuel concentration based on pressure measurement.

In cases where an affirmative determination is made at Step 604, it is determined at Step 605 that fuel concentration detection based on pressure measurement will be started, and the processing illustrated in FIG. 7 follows.

FIG. 7 is a flowchart illustrating a concentration detection routine for detecting a fuel concentration based on pressure measurement. The processing illustrated in FIG. 7 corresponds to a second fuel status determining device. Before this concentration detection routine is executed, the purge valve 16 is closed, the switching valve 18 is in the first position such that the canister 13 communicates with the atmosphere line 17, and the three-position valve 21 is in the first position so as to connects the air supply line 20 to the measurement line 22. For this reason, the pressure detected by the pressure sensor 24 in the initial state is substantially equal to the atmospheric pressure.

At Step 701, pressure P0 is measured with the pressure sensor 24 with air as the gas flowing through the measurement line 22. This state is equivalent to the "first measurement state." Measurement of pressure P0 by an air flow is carried out by driving the pump 26 with the three-position valve 21 kept in the first position. In this case, the measurement line 22 is supplied with air through the air supply line 20. The portion of the air supply line 20 positioned upstream of the throttle 23 is under the same pressure as one end of the pressure sensor 24 is. The other end of the pressure sensor 24 is connected to the portion of the air supply line 20 positioned downstream of the throttle 23. Therefore, the pressure sensor 24 detects the amount of pressure drop that occurs when air passes through the throttle 23.

Figure 8:
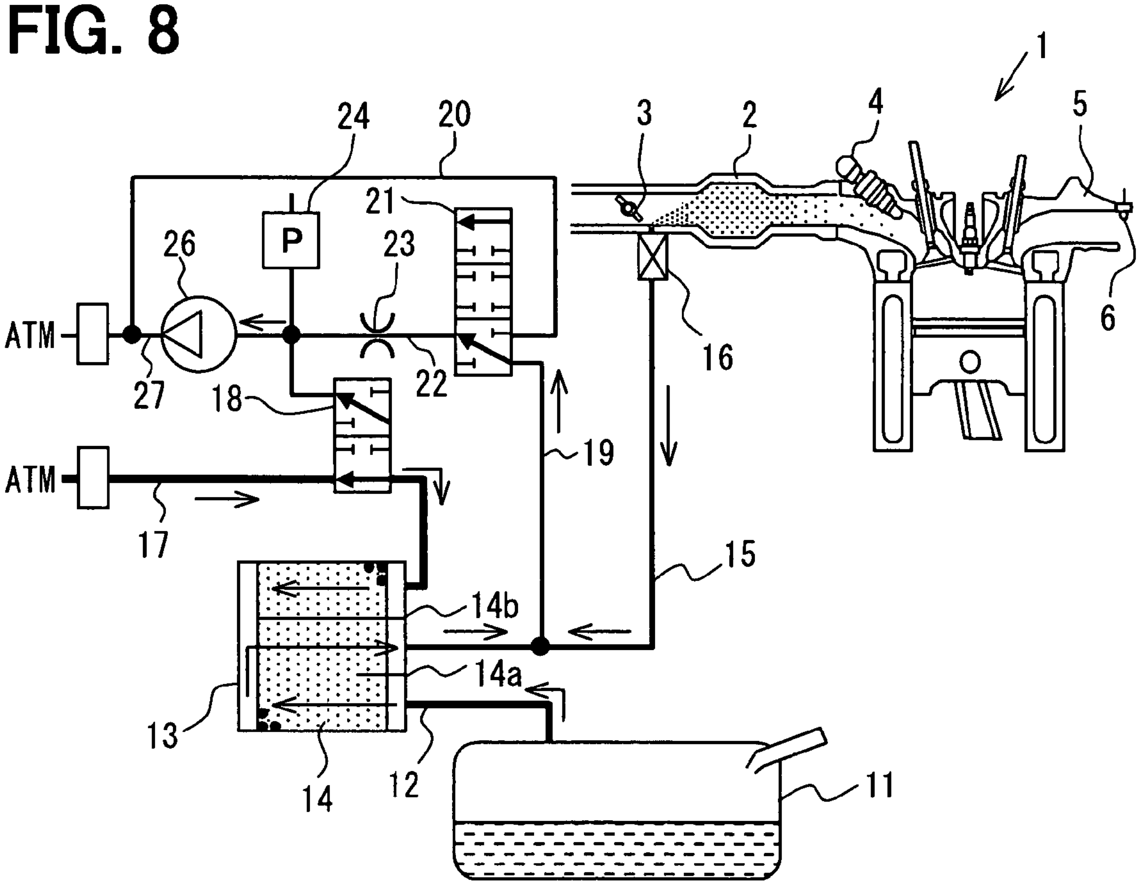
FIG. 8 is a schematic diagram illustrating the state of gas circulation established when Step 702 of FIG. 7 is carried out.

At Step 702, pressure P1 is measured with air-fuel mixture containing fuel vapor as the gas flowing through the measurement line 22. This state is equivalent to the "second measurement state." Measurement of pressure P1 by an air-fuel mixture flow is carried out by changing the setting of the three-position valve 21 to the third position and driving the pump 26. FIG. 8 illustrates the state of gas circulation established at this time. As illustrated in FIG. 8, the measurement line 22 is supplied with air-fuel mixture containing fuel vapor through the atmosphere line 17, the canister 13, part of the purge line 15 extending to the branch line 19, and the branch line 19. More specific description will be given. The air introduced from the atmosphere line 17 flows in the canister 13, and as a result, air-fuel mixture of fuel vapor and air is produced. This air-fuel mixture is supplied to the measurement line 22 through part of the purge line 15 and the branch fine 19.

Therefore, the portion of the purge line 15 extending from the canister 13 to the branch line 19, the branch line 19, and the measurement line 22 form the air-fuel mixture circulation portion in which air-fuel mixture flows. In pressure measurement by an air-fuel mixture flow, the pressure sensor 24 detects the amount of pressure drop that occurs when air-fuel mixture containing fuel vapor passes through the throttle 23 in the measurement line 22.

Next, at Step 703, a fuel concentration C is calculated based on the pressures P0 and P1 measured at Step 701 and Step 702, and is stored.

The fuel concentration C is calculated by calculating the pressure ratio RP of pressure P1 to pressure P0 according to Equation (1) (shown below) and then calculating C based on the pressure ratio RP according to Equation (2) (shown below). In Equation (2), k1 is a constant obtained beforehand by experiment or the like.

$$RP=P1/P0 \tag{1}$$

$$C=k1\times(RP-1)(=(P1-P0)/P0 \tag{2}$$

Since fuel vapor is heavier than air, the inclusion of fuel vapor in purged gas increases the density of the purged gas. When the number of revolutions of the pump 26 is substantially identical and the flow velocity (flow rate) in the measurement line 22 is substantially identical, the differential pressure between upstream and downstream of the throttle 23 is increased with increase in density due to the law of conservation of energy. Therefore, the pressure ratio RP is increased with increase in the fuel concentration C, and the relation between fuel concentration C and pressure ratio RP is linear as indicated by Equation (2) (shown above). Thus, the calculated fuel concentration C represents the concentration of fuel vapor in purged gas in mass ratio.

At Step 704, each member is returned to its initial state. That is, the switching valve 18 is turned to the first position in which the canister 13 and the atmosphere line 17 communicate with each other; and the three-position valve 21 is turned to the first position in which the air supply line 20 is connected to the measurement line 22.

Figure 9:
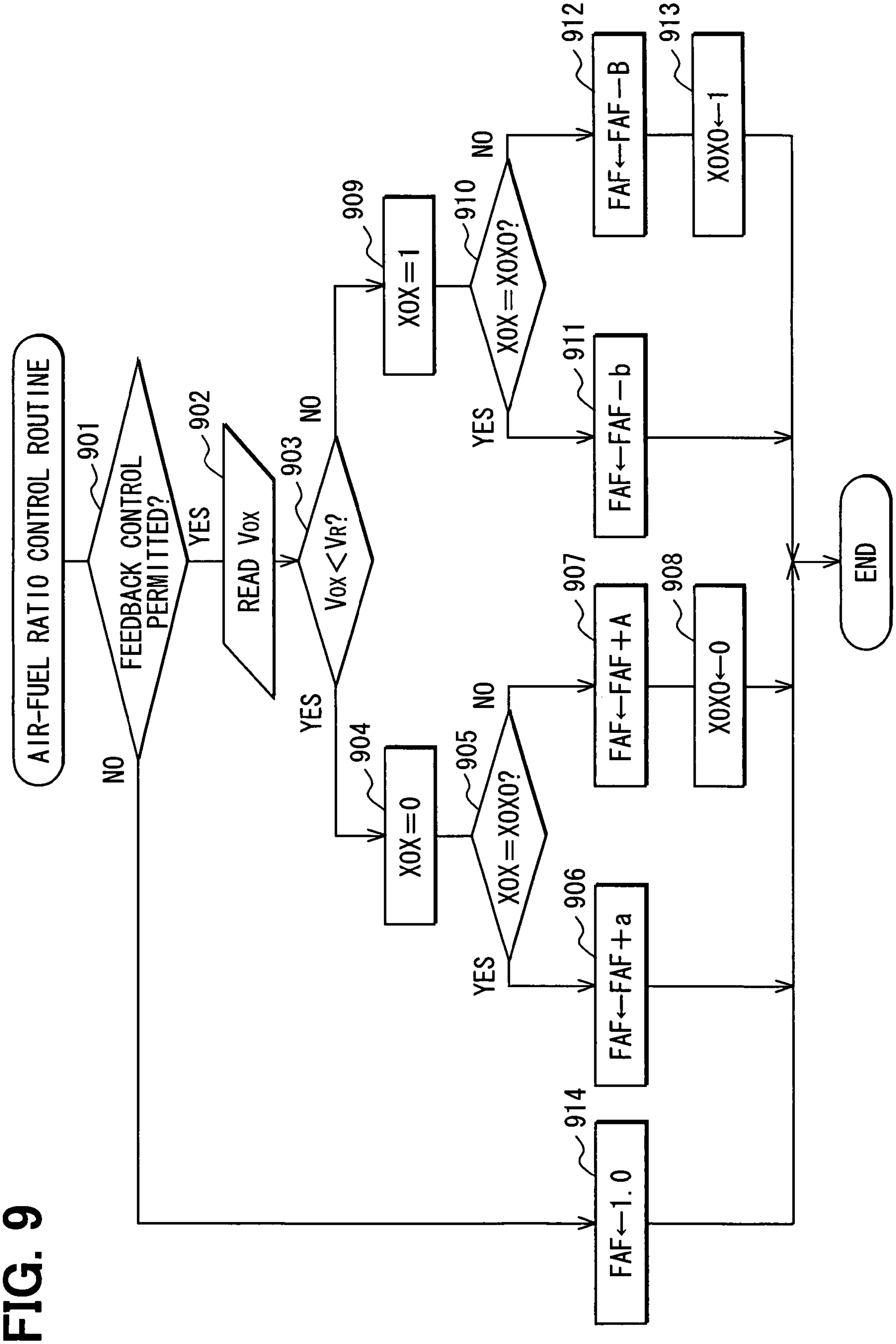
FIG. 9 is a flowchart illustrating an air-fuel ratio control routine.

FIG. 9 is a flowchart of an air-fuel ratio control routine. This routine is carried out each time a cam angle becomes equal to a certain, predetermined value.

At Step 901, it is determined whether or not air-fuel ratio feedback control is permitted. In one embodiment, air-fuel ratio feedback control is permitted (i.e., Step 901 is answered affirmatively) when the system is not at start, fuel cut is not underway, cooling water temperature (THW)≧0° C., and activation of the air-fuel ratio sensor has been completed. If any one of these conditions is not met, the air-fuel ratio feedback control is not permitted, and Step 901 is answered negatively.

However, in cases where an affirmative determination is made at Step 901, Step 902 follows. At Step 902, the output voltage $V_{OX}$ of the air-fuel ratio sensor 6 is read. At Step 903, it is determined whether or not the output voltage $V_{OX}$ is equal to or higher than a predetermined reference voltage $V_R$ (e.g., 0.45V). In cases where an affirmative determination is made at Step 903, it is determined that the air-fuel ratio of exhaust gas is lean, and the process proceeds to Step 904. Then, air-fuel ratio flag XOX is set to zero (0).

Then, in Step 905, it is determined whether or not the air-fuel ratio flag XOX and state sustenance flag XOXO agree with each other. In cases where an affirmative determination is made at Step 905, it is determined that the lean state is continuing. Then, at Step 906, air-fuel ratio correction coefficient FAF is increased by a lean integration amount "a," and this routine is terminated. In cases where a negative determination is made at Step 905, it is determined that the lean state has been turned to the rich state and the process proceeds to Step 907. Then, the air-fuel ratio correction coefficient FAF is increased by a lean skip amount "A." The lean skip amount "A" is set such that it is sufficiently larger than the lean integration amount "a." At Step 908, the state sustenance flag XOXO is reset, and this routine is terminated.

In cases where a negative determination is made at Step 903, it is determined that the air-fuel ratio of exhaust gas is rich, and the flow proceeds to Step 909. Then, the air-fuel ratio flag XOX is set to "1." At Step 910, it is determined whether or not the air-fuel ratio flag XOX and the state sustenance flag XOXO agree with each other. In cases where an affirmative determination is made at Step 910, it is determined that the rich state is continuing. Then, at Step 911, the air-fuel ratio correction coefficient FAF is decreased by a rich integration amount "b," and this routine is terminated. In cases where a negative determination is made at Step 910, it is determined that the lean state has been turned to the rich state and the flow proceeds to Step 912. Then, the air-fuel ratio correction coefficient FAF is decreased by a rich skip amount "B." The rich skip amount "B" is so set that it is sufficiently larger than the rich integration amount "b."

At Step 913, the state sustenance flag XOXO is set to "1," and this routine is terminated.

In cases where a negative determination is made at Step 901, the flow proceeds to Step 914. Then, the air-fuel ratio correction coefficient FAF is set to "1.0," and this routine is terminated.

Figure 10:
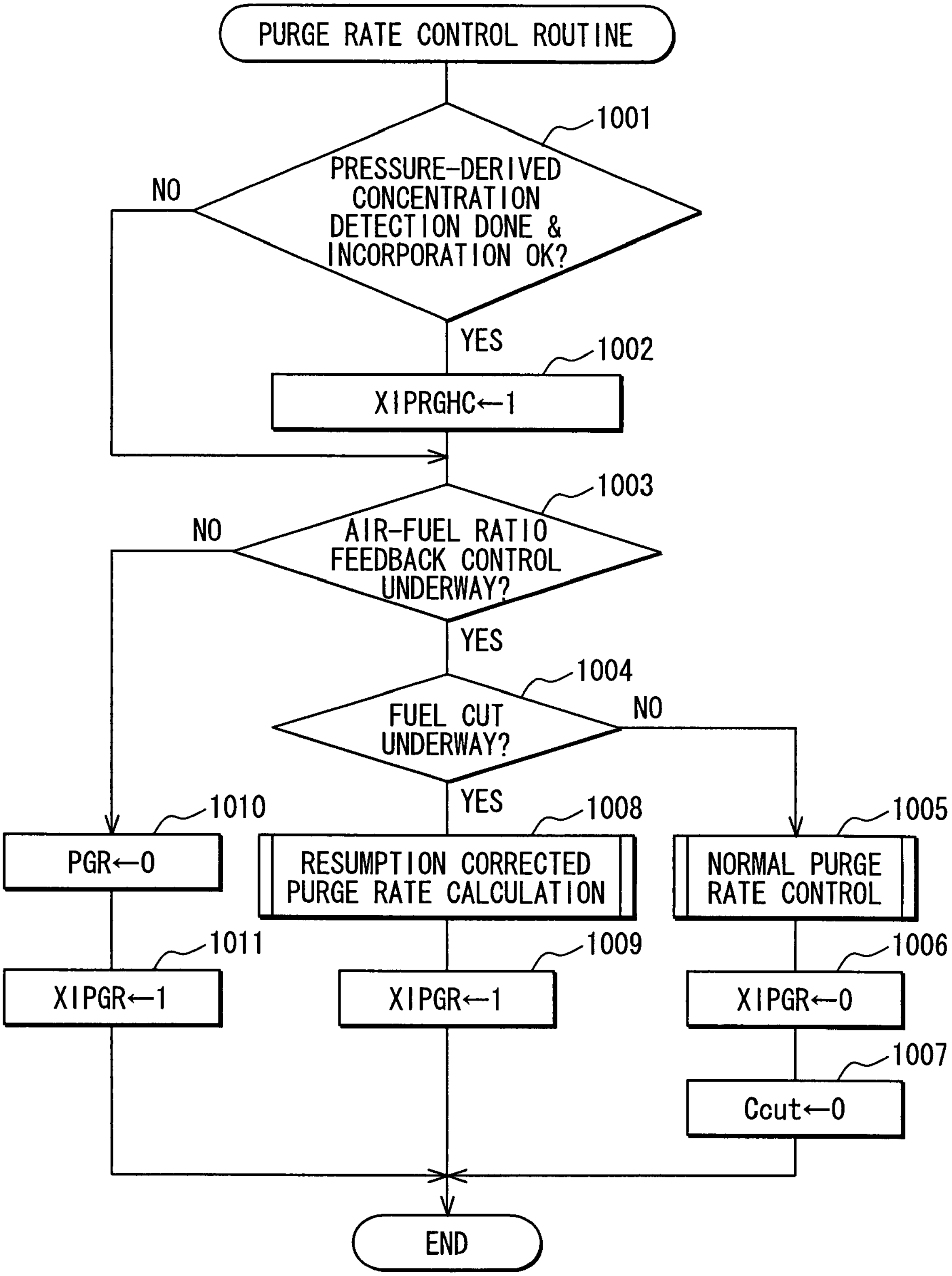
FIG. 10 is a flowchart illustrating a purge rate control routine.

FIG. 10 is a flowchart of a purge rate control routine. At Step 1001, it is determined whether or not fuel concentration detection based on pressure measurement, illustrated in FIG. 7, has been completed. In Step 1001, it is also determined whether it has been permitted to incorporate a fuel concentration determination based on pressure measurement. (This pressure-derived concentration is determined in a routine illustrated in FIG. 21 and described in greater detail below.) When it is required in the following description to discriminate the above fuel concentration from a fuel concentration determination based on an air-fuel ratio, it will be referred to as pressure-derived concentration.

In cases where an affirmative determination is made at Step 1001, a pressure-derived concentration can be incorporated into purge rate control and injection quantity control. At Step 1002, therefore, pressure-derived concentration incorporation permission flag XIPRGHC is set to "1," and then the processing of Step 1003 is carried out. In cases where a negative determination is made at Step 1001, the processing of Step 1003 is directly carried out.

At Step 1003, it is determined whether or not air-fuel ratio feedback control is underway. In cases where an affirmative determination is made at Step 1003, the flow proceeds to Step 1004, and it is determined whether or not fuel cut is underway.

In cases where a negative determination is made at Step 1004, the flow proceeds to Step 1005 and normal purge rate control is carried out, and then the flow proceeds to Step 1006. At Step 1006, purge stop flag XIPGR is reset (set to 0). At Step 1007, the fuel cut counter Ccut is reset, and this routine is terminated.

In cases where an affirmative determination is made at Step 1004, the process proceeds to Step 1008, and resumption corrected purge rate calculation is carried out. At Step 1009, subsequently, the purge stop flag XIPGR is set to "1," and this routine is terminated.

In cases where a negative determination is made at Step 1003, the process proceeds to Step 1010, and the purge rate PGR is reset (set to 0). At Step 1011, subsequently, the purge stop flag XIPGR is set to "1" and this routine is terminated.

Figure 11:
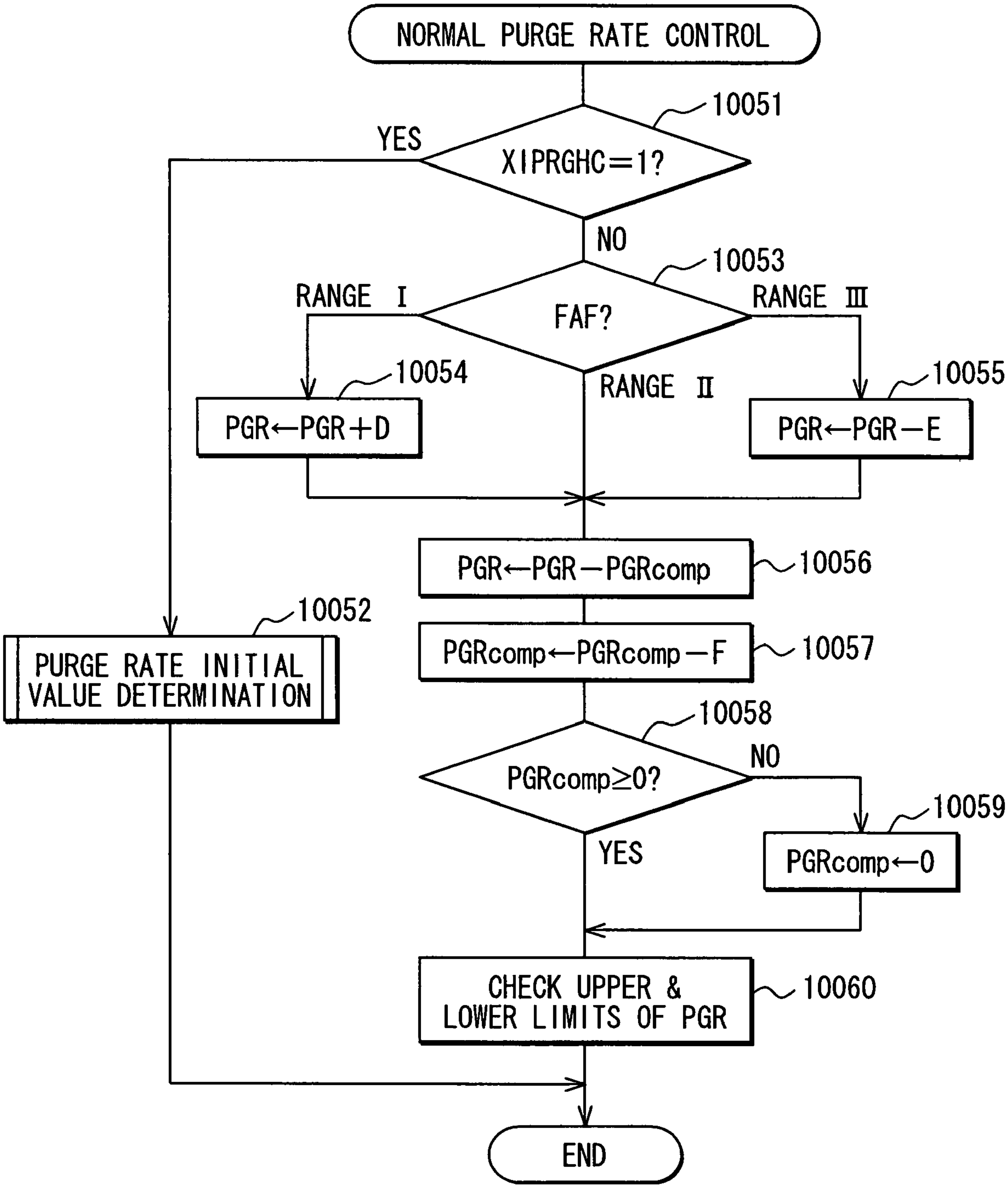
FIG. 11 is a flowchart illustrating a normal purge rate control processing of the purge rate control routine of FIG. 10.

FIG. 11 is a flowchart of the normal purge rate control processing carried out at Step 1005 in the purge rate control routine illustrated in FIG. 10. At Step 10051, it is determined whether or not the pressure-derived concentration incorporation permission flag XIPRGHC is set to "1." In cases where this determination is affirmative, a purge rate initial value determination routine is carried out at Step 10052.

Figure 12:
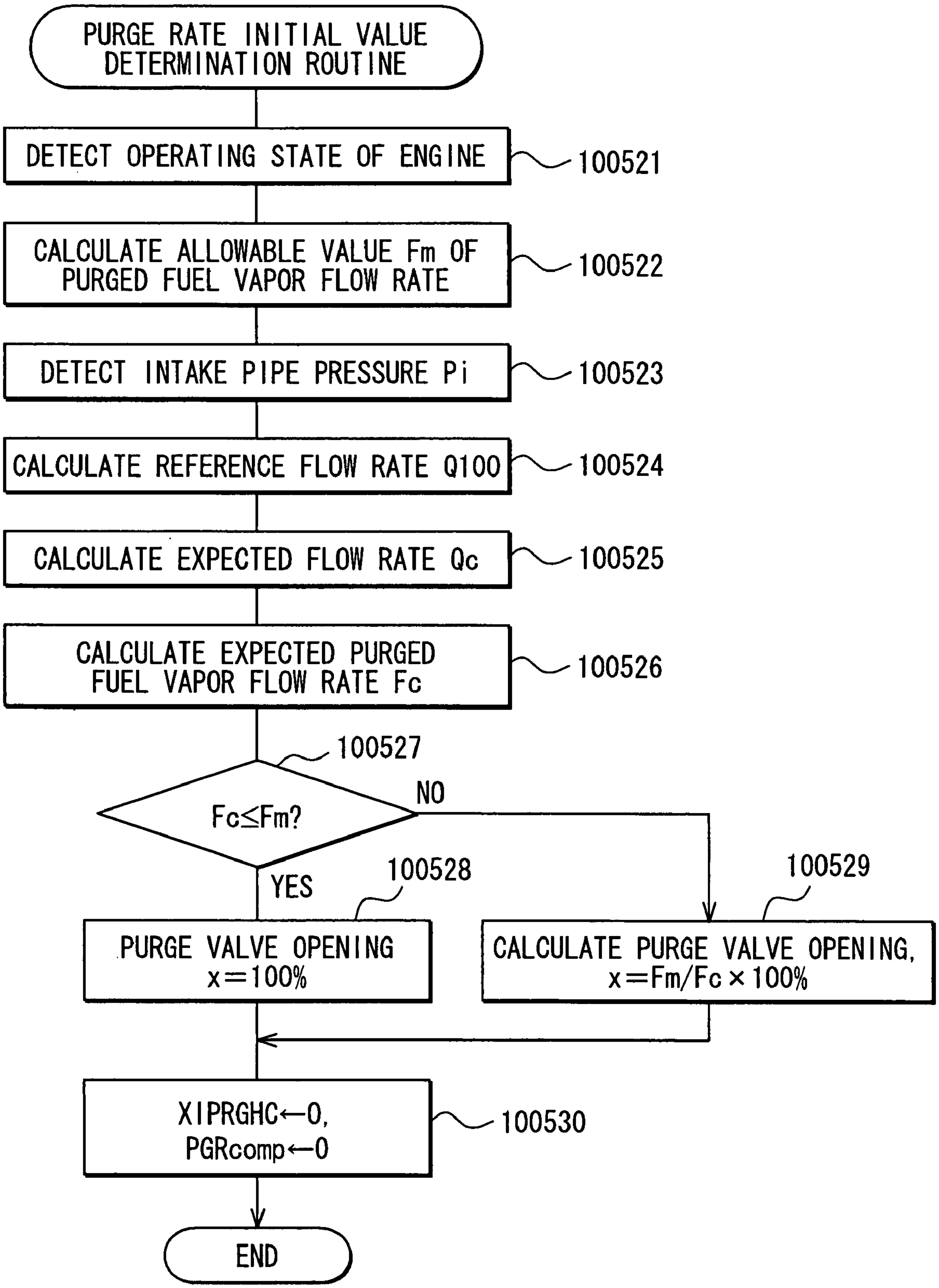
FIG. 12 is a flowchart illustrating a purge rate initial value determination routine of the normal purge rate control processing of FIG. 11.

FIG. 12 illustrates the details of the purge rate initial value determination routine. At Steps 100521 and 100522, an allowable upper limit value of purge flow rate is set. More specific description will be given. At Step 100521, the operating state of the engine is detected, and at Step 100522, an allowable value Fm of purged fuel vapor flow rate is calculated based on the detected operating state of the engine. The allowable value Fm of purged fuel vapor flow rate is calculated based on an injection quantity demanded in the operating state of the engine, such as the present throttle opening, a lower limit value of injection quantity controllable at an injector 4, and the like. A large injection quantity acts in the direction in which a ratio of purged fuel vapor flow rate to injection quantity is reduced. Therefore, large values are permitted for the allowable value Fm of purged fuel vapor flow rate.

Figure 13:
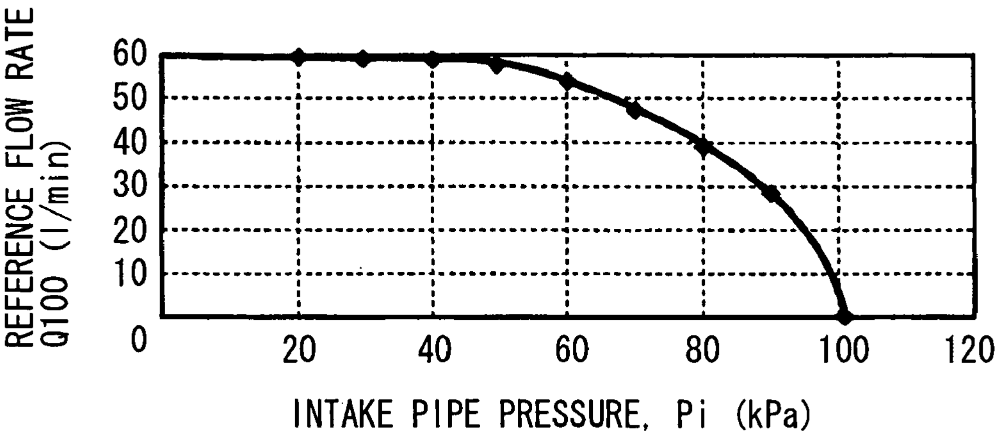
FIG. 13 is a graph illustrating one embodiment of a reference flow rate map.

At Step 100523, the present intake pipe pressure Pi is detected with the intake pressure sensor, not shown, and at Step 100524, reference flow rate Q100 is calculated based on the intake pipe pressure Pi. The reference flow rate Q100 is defined as the flow rate of gas flowing in the purge line 15 when the gas flowing in the purge line 15, is 100% air and the opening of the purge valve 16 is 100%. (This opening will be hereafter referred to as purge valve opening as appropriate.) The reference flow rate is calculated according to a reference flow rate map. FIG. 13 shows one embodiment of such a reference flow rate map.

Figure 14:
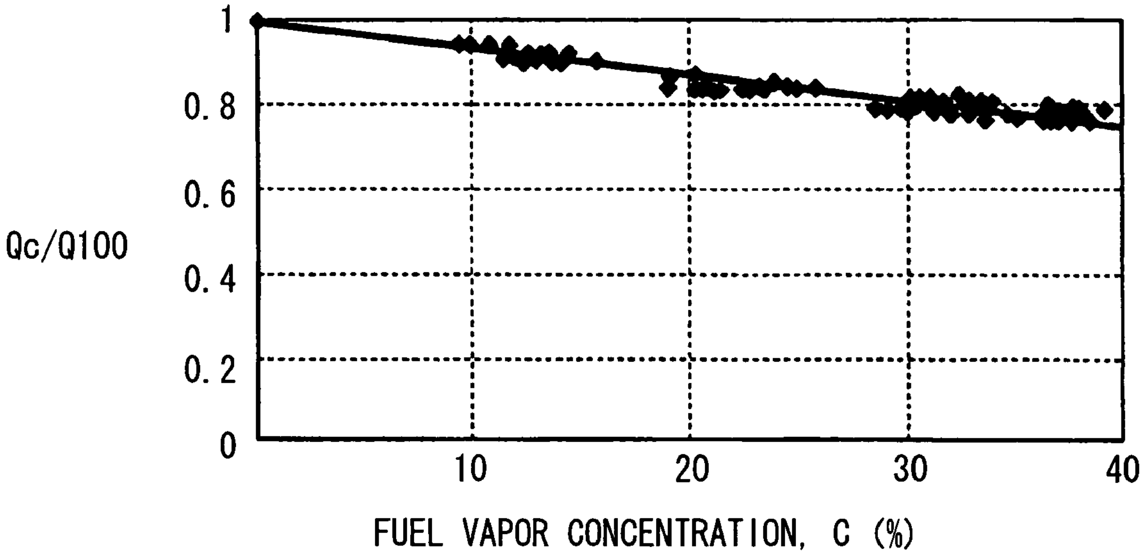
FIG. 14 is a graph showing a relationship between fuel concentration C and the ratio of expected flow rate Qc to reference flow rate Q100 (Qc/Q100)

At Step 100525, an expected flow rate Qc of purged air-fuel mixture is calculated based on the fuel concentration C detected by the fuel concentration detection routine (FIG. 7) by Equation (3) (shown below). The expected flow rate Qc is defined as the expected value of purged gas flow rate obtained when purged gas of the present fuel concentration C is passed through the purge line 15 with the purge valve opening set to 100%. FIG. 14 illustrates the relation between fuel concentration C and the ratio of expected flow rate Qc to reference flow rate Q100 (Qc/Q100). When the fuel concentration C is increased, the density of purged gas is increased. As a result, even when the intake pipe pressure Pi is identical, the flow rate is reduced by the energy conservation law as compared with cases where the purged gas is 100% air. The straight line in the drawing is equivalent to Equation (3). The variable "A" in Equation (3) is a predetermined constant in the ROM of the electronic control unit together with a control program and the like.

$$Qc=Q100\times(1-A\times C) \tag{3}$$

At Step 100526, an expected flow rate Fc of purged fuel vapor obtained when purged gas of the present fuel concentration C is passed through the purge line 15 with the purge valve opening set to 100% is calculated based on the fuel concentration C and the expected flow rate Qc by Equation (4) (shown below). (This expected flow rate of purged fuel vapor will be hereafter referred to as expected purged fuel vapor flow rate.)

$$Fc=Qc\times C \tag{4}$$

The processing of Steps 100527 to 100529 is for setting a purge valve opening X. At Step 100527, the expected purge fuel vapor flow rate Fc is compared with the allowable value Fm of purged fuel vapor flow rate to determine whether $Fc\leqq Fm$. In cases where an affirmative determination is made at this step, the flow proceeds to Step 100528, and the purge valve opening X is set to 100%. This is because even when the purge valve opening X is set to 100%, there is a margin until the allowable value Fm of purge fuel vapor flow rate is reached. In cases where it is determined whether or not $Fc\leqq Fm$ and a negative determination is made at Step 100527, it is determined that with the purge valve opening X set to 100%, air-fuel ratio control cannot be properly carried out due to excess fuel vapor. Then, the flow proceeds to Step 100529, and the purge valve opening X is set to $(Fm/Fc)\times 100\%$. This is because with $Fc>Fm$, the maximum value of purge flow rate at which proper air-fuel ratio control is ensured is equal to the allowable value Fm of purge fuel vapor flow rate.

As the result of the purge valve opening X being calculated at Step 100528 or 100529, the opening of the purge valve 16 is controlled to the calculated opening.

After the execution of the processing of Step 100528 or 100529, the pressure-derived concentration incorporation permission flag XIPRGHC is reset (zeroed) at Step 100530. At the same time, resumption corrected purge rate PGRcomp is zeroed. As the result of the pressure-derived concentration incorporation permission flag XIPRGHC being reset at Step 100530, the determination made at Step 10051 in FIG. 11 is thereafter negative, and the processing of Step 10053 and the following steps is carried out.

Figure 15:
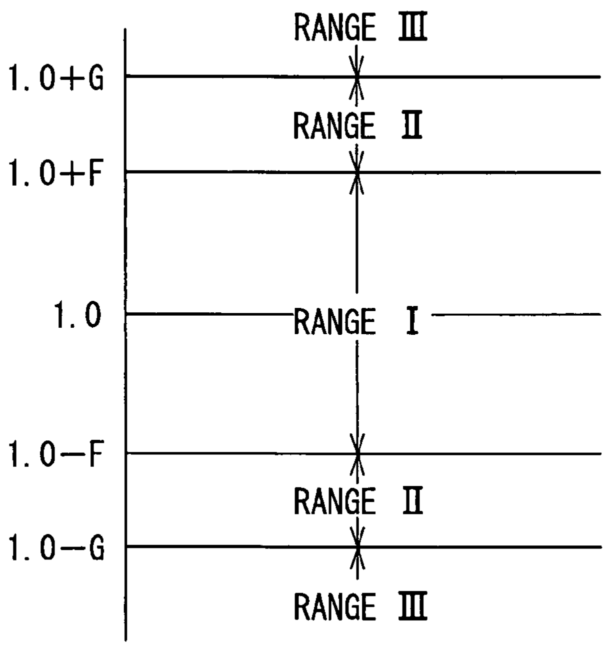
FIG. 15 is a graph showing ranges of air-fuel ratio correction coefficient FAF.

At Step 10053, it is determined to which range the air-fuel ratio correction coefficient FAF belongs. FIG. 15 is a graph showing the ranges of the air-fuel ratio correction coefficient FAF When the air-fuel ratio correction coefficient is within the range of $1\pm F$, it is determined to belong to range II; when it is between the $1\pm F$ and $1\pm G$, it is determined to belong to range II; when it is beyond $1\pm G$, it is determined to belong to range III. F and G are so set that $0<F<G$.

In cases where it is determined at Step 10053 that the air-fuel ratio correction coefficient belongs to range I, the flow proceeds to Step 10054. Then, the purge rate PGR is increased by a predetermined purge rate increment D, and the flow proceeds to Step 10056. In cases where it is determined at Step 10053 that the air-fuel ratio correction coefficient belongs to range III, the flow proceeds to Step 10055. Then, the purge rate PGR is decreased by a predetermined purge rate decrement E, and the flow proceeds to Step 10056. In cases where it is determined at Step 10053 that the air-fuel ratio correction coefficient belongs to range II, the flow directly proceeds to Step 10056.

At Step 10056, the resumption corrected purge rate PGRcomp, described later, is subtracted from the purge rate PGR, and the flow proceeds to Step 10057. At Step 10057, the predetermined constant value F is subtracted from the resumption corrected purge rate PGRcomp. Subsequently, at Step 10058, it is determined whether or not the resumption corrected purge rate PGRcomp is positive.

In cases where a negative determination is made at Step 10058, the resumption corrected purge rate PGRcomp is set to the lower limit value "0" at Step 10059, and the flow proceeds to Step 10060. In cases where an affirmative determination is made at Step 10058, the flow directly proceeds to Step 10060. Then, the upper and lower limits of purge rate PGR are checked, and this routine is terminated.

Figure 16:
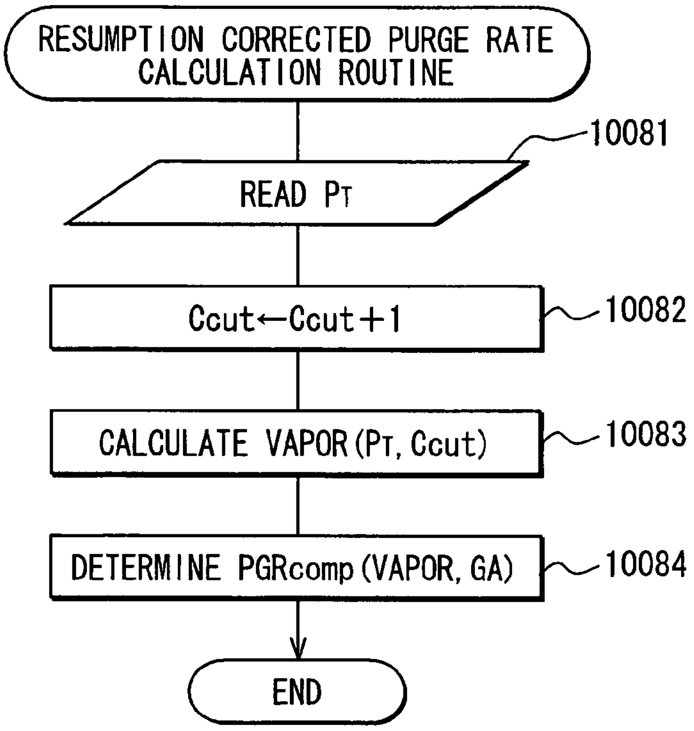
FIG. 16 is a flowchart illustrating a resumption corrected purge rate calculation of the purge rate control routine of FIG. 10.

FIG. 16 is a flowchart of the resumption corrected purge rate calculation carried out at Step 1008 in the purge rate control routine illustrated in FIG. 10. At Step 10081, the pressure $P_T$ in the fuel tank 11 is detected with the pressure sensor, not shown, provided in the fuel tank. The fuel tank internal pressure $P_T$ is a function of the quantity of fuel vapor in the fuel tank 11. The quantity of fuel vapor in the fuel tank 11 represents equilibrium among the evaporation of fuel, its discharge into the canister 13, the liquefaction of fuel vapor, and the like. Therefore, the fuel tank internal pressure $P_T$ represents the degree of evaporation of fuel in the fuel tank 11. The degree of fuel evaporation is determined almost exclusively by the fuel temperature and the pressure acting on the fuel surface. Therefore, the fuel temperature may be used in place of the fuel tank internal pressure $P_T$ as an index of the degree of fuel evaporation. However, when the fuel tank internal pressure $P_T$ is used as a parameter, more accurate detection can be easily carried out because the influence of change in the atmospheric pressure and the like are canceled out At Step 10082, the fuel cut counter Ccut is incremented, and the flow proceeds to Step 10083. The fuel cut counter Ccut represents the duration of a fuel cut state. At Step 10083, as a function of the fuel tank internal pressure $P_T$ and the fuel cut counter Ccut, a quantity VAPOR($P_T$, Ccut) of fuel vapor adsorbed into the canister 14 during fuel cut is determined.

In one embodiment, the following can be used as a function for determining a fuel vapor quantity VAPOR. Specifically, a fuel vapor quantity $\alpha(P_T)$ per unit time is obtained as a function of the fuel tank internal pressure $P_T$. Consequently, a fuel vapor quantity VAPOR can be obtained by the expression below in which a fuel vapor quantity $\alpha$ per unit time is multiplied by a count value on the fuel cut counter Ccut (i.e., $VAPOR=\alpha(P_T)\cdot Ccut$).

At Step 10084, a resumption corrected purge rate PGRcomp is determined as a function of the fuel vapor quantity VAPOR and the intake air quantity GA detected by the air flow sensor (i.e., $PGRcomp=\beta\cdot VAPOR/GA$ where $\beta$ is a coefficient).

FIG. 17 is a flowchart of a purge control valve driving routine, in which the opening of the purge valve 16 is controlled by so-called duty ratio control. At Step 171, it is determined whether or not the purge stop flag XIPGR is "1." In cases where an affirmative determination is made at this step, it is determined that purging is at a stop. Then, at Step 172, the duty ratio Duty is set to "0," and this routine is terminated.

In cases where a negative determination is made at Step 171, it is determined that purging is underway, and the flow proceeds to Step 173 and a duty ratio Duty is calculated by the following equation:

$$Duty=\gamma\cdot PGR/PGR100+\delta$$

where, PGR100 is a full open purge rate and $\gamma$ and $\delta$ are correction coefficients determined by battery voltage and atmospheric pressure. The full open purge rate represents an amount of purge obtained when the purge valve 16 is fully opened. This full open purge rate is preset in the form of map in which the relation between engine revolution speed Ne and throttle valve opening TA is defined. FIG. 18 shows an example of the setting of a map for determining this full open purge rate.

Figure 19:
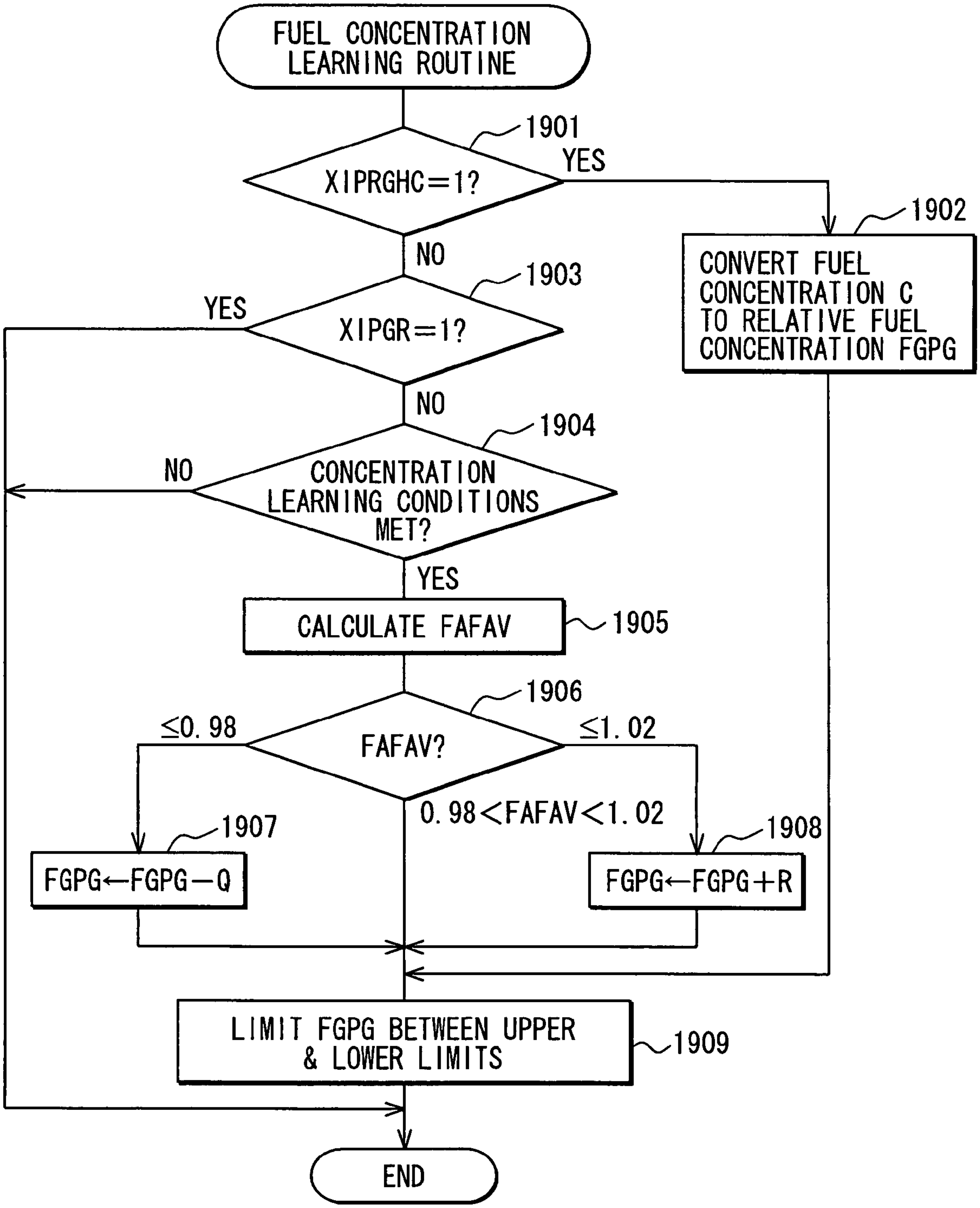
FIG. 19 is a flowchart illustrating a fuel concentration learning routine for calculating a fuel concentration FGPG.

FIG. 19 is a flowchart of a fuel concentration learning routine for calculating a fuel concentration FGPG At Step 1901, it is determined whether or not the pressure-derived concentration incorporation permission flag XIPRGHC is 1. In cases where an affirmative determination is made at Step 1901, the processing of Step 1902 equivalent to a concentration converting device is carried out. At Step 1902, the fuel concentration C determined by the processing illustrated in FIG. 7 is converted into a fuel concentration FGPG by substituting the fuel concentration C into the expression below. The fuel concentration FGPG represents the relative fuel vapor concentration of purged gas obtained by comparing the fuel concentration C with the theoretical air-fuel ratio (e.g., 14.6) as the target air-fuel ratio.

$$FGPG=(1-C)-(14.6\times C\times \text{fuel vapor density/air density})$$

Predetermined constant values may be used for the density of fuel vapor and the density of air. Alternatively, they may be determined based on temperature.

The fuel concentration FGPG is 0 when the ratio of fuel vapor in purged gas is equal to that in air-fuel mixture of the theoretical air-fuel ratio, and is negative when the ratio of fuel vapor is larger than in the theoretical air-fuel ratio. It is positive when the ratio of fuel vapor is smaller than in the theoretical air-fuel ratio, and is 1 when fuel vapor is not contained at all. Therefore, it can also be said that the fuel concentration FGPG represents a degree of the deviation of purged gas from the theoretical air-fuel ratio. After the execution of the processing of Step 1902, the flow proceeds to Step 1909 the processing of which will be described later.

In cases where a negative determination is made at Step 1901, the flow proceeds to Step 1903 and it is determined whether or not the purge stop flag XIPGR is "1." In cases where an affirmative determination is made at this step, it is determined that purging is at a stop and this routine is terminated here.

In cases where a negative determination is made at Step 1903, the flow proceeds to Step 1904, and it is determined whether or not fuel concentration learning conditions are met. In one embodiment, for instance, learning is carried out (i.e., Step 1904 is answered affirmatively) when air-fuel ratio feedback control is underway, cooling water temperature≧80° C., increase in fuel at start=0, and increase in fuel during warm-up=0. Learning is not carried out (i.e., Step 1904 is answered negatively) when any of these conditions is not met.

In cases a negative determination is made at Step 1904, that is, learning is not carried out, this routine is terminated. In cases where an affirmative determination is made at Step 1904, that is, learning is carried out, the process proceeds to Step 1905. At Step 1905, a temporal average value FAFAV is calculated with respect to the air-fuel ratio correction coefficient FAF calculated through the air-fuel ratio control routine illustrated in FIG. 9, and the process proceeds to Step 1906.

At Step 1906, it is determined in which range the average value FAFAV. In one embodiment, FAFAV can be in a range not more than "0.98," a range greater than "0.98" and less than "1.02," or range not less than "1.02."

In cases where the average value FAFAV is in the range not more than "0.98, " the flow proceeds to Step 1907. Then, the fuel concentration FGPG is decreased by a predetermined quantity "Q" (e.g., 0.4%), and the process proceeds to Step 1909.

In cases where the average value FAFAV is in the range not less than "1.02," the flow proceeds to Step 1908. Then, the fuel concentration FGPG is increased by a predetermined quantity "R" (e.g., 0.4%), and the flow proceeds to Step 1909.

In cases where the average value FAFAV is in the range greater than "0.98" and less than "1.02," the fuel concentration FGPG is not updated and the flow directly proceeds to Step 1909. The fuel concentration FGPG determined through the processing of Steps 1905 to 1908 is equivalent to the first fuel concentration, that is, the first fuel status. The processing of Steps 1905 to 1908 is equivalent to a first fuel status determining device.

When the concentration of fuel vapor in purged gas is "0," the fuel concentration FGPG determined by carrying out the processing of Step 1907 or Step 1908 is set to "1." This value becomes smaller than 1 with increase in fuel concentration. At Step 1909, the fuel concentration FGPG is limited to a value between predetermined upper and lower limit values, and this routine is terminated.

FIG. 20 is a flowchart of an injector control routine. At Step 2001, a basic fuel injection time Tp is determined as a function of engine revolution speed Ne and intake air quantity GA (i.e., Tp=Tp(Ne, GA)).

At Step 2002, subsequently, a purge correction coefficient FPG is calculated based on the purge rate PGR and the fuel concentration FGPG determined through the processing illustrated in FIG. 19 (i.e., FPG=FGPG·PGR).

At Step 2003, an injector valve opening time TAU is determined according to the equation:

$$TAU=\alpha\cdot Tp\cdot(FAF+FPG)+\beta$$

using the air-fuel ratio correction coefficient FAF calculated through the air-fuel ratio control routine illustrated in FIG. 9 and the above purge correction coefficient FPG where α and β are correction coefficients including increase in quantity at start, increase in quantity during warm-up, and the like.

At Step 2004, the injector valve opening time TAU is outputted, and this routine is terminated.

As is apparent from Step 2002 in the routine illustrated in FIG. 20, the injector valve opening time TAU corresponding to the quantity of injection into the engine 1 is controlled based on the fuel concentration FGPG. In cases where use of pressure-derived concentration is permitted (i.e., the pressure-derived concentration incorporation permission flag XIPRGHC is 1), the following is used for the fuel concentration FGPG: what is obtained by converting a fuel concentration C as pressure-derived concentration into a relative fuel concentration FGPG.

The status of the pressure-derived concentration incorporation permission flag XIPRGHC is determined by carrying out the routine for determining whether to permit detection and incorporation of pressure-derived concentration, illustrated in FIG. 21. This routine is repeatedly carried out at predetermined intervals. The processing illustrated in FIG. 21 is equivalent to a reliability determining device.

At Step 2101 in the routine illustrated in FIG. 21, it is determined whether or not the validity of pressure-derived concentration has been confirmed at Step 2111, described later. In cases where the validity has been confirmed, this routine is terminated here. At the beginning, the determination made at Step 2101 is negative; therefore, the process proceeds to Step 2102. At Step 2102, detection of a pressure-derived concentration is permitted, and incorporation of the pressure-derived concentration is also permitted. The latter is implemented by setting the pressure-derived concentration incorporation permission flag XIPRGHC to 1.

After the execution of the processing of Step 2102, the processing of Step 2103 is carried out. At Step 2103, it is determined whether the result of execution of the leak check control routine illustrated in FIG. 2 reveals the presence of a leak in the leak check closed space. In cases where this determination is negative, that is, it is determined that there is not a leak in the leak check closed space, it can be supposed that: the fuel concentration C calculated by carrying out the fuel concentration detection routine based on pressure measurement illustrated in FIG. 7, that is, the pressure-derived fuel concentration is accurate. Since use of this pressure-derived fuel concentration is appropriate, the processing of Step 2111 is carried out to determine that validity has been confirmed.

In cases where the presence of a leak hole is detected and an affirmative determination is made at Step 2103, it is required to further check the validity of the pressure-derived concentration. The closed space formation portion and the air-fuel mixture circulation portion that from the leak check closed space do not completely overlap with each other. Therefore, even when a leak has been produced somewhere in the leak check closed space, the accuracy of pressure-derived concentration is not always degraded.

The air-fuel mixture circulation portion is the portion of the purge line 15 extending from the canister 13 to the branch line 19, the branch line 19, and the measurement line 22. The closed space formation portion that forms the leak check closed space is the fuel tank 11, evapo line 12, canister 13, purge line 15, branch line 19, and the line extending from the canister 13 to the pump 26 by way of the switching valve 18. Therefore, the air-fuel mixture circulation portion and the closed space formation portion include the portion of the purge line 15 extending from the canister 13 to the branch line 19 and the branch line 19 in common. These are the first component portion of the air-fuel mixture circulation portion, and the remaining portion of the air-fuel mixture circulation portion is the second component portion. The portion of the purge line 15 positioned between the branch line 19 and the purge valve 16 is an air-fuel mixture circulation-related portion that communicates with the first component portion of the air-fuel mixture circulation portion downstream of the canister 13. Even when there is a leak in this air-fuel mixture circulation-related portion (the portion of the purge line 15 positioned between the branch line 19 and the purge valve 16), the fuel concentration of air-fuel mixture flowing through the throttle 23 is lowered.

Specifically, the validity (reliability) of the pressure-derived concentration is checked by carrying out the processing of Step 2104 and the following steps. At Step 2104, it is determined whether or not detection of a pressure-derived concentration has been completed. The processing of Step 2102 is carried out without fail before the processing of Step 2104 is carried out. Therefore, it has been permitted to carry out the routine illustrated in FIG. 7 to detect a pressure-derived concentration.

In cases where detection of a pressure-derived concentration has not been completed and a negative determination is made at Step 2104, incorporation of a pressure-derived concentration is prohibited at Step 2105, and this routine is terminated. In this case, the determination made at Step 1001 in the routine illustrated in FIG. 10 is negative. At Step 2002 in the routine illustrated in FIG. 20, a fuel concentration FGPG learned based on the deviation of air-fuel ratio is used.

In cases where an affirmative determination is made at Step 2104, it is further determined at Step 2106 whether or not learning of the fuel concentration FGPG based on the deviation of air-fuel ratio has been completed. This determination is made based on that variation in the fuel concentration FGPG due to the fuel concentration learning routine, illustrated in FIG. 19, being repeated at predetermined intervals is reduced. For example, the determination is made based on whether or not this variation has become equal to or smaller than a predetermined variation. Also, in cases where the determination made at Step 2106 is negative, the validity of pressure-derived concentration cannot be checked. Therefore, the processing of Step 2105 is carried out to prohibit incorporation of the pressure-derived concentration.

In cases where an affirmative determination is made at Step 2106 as well, the flow proceeds to Step 2107. At Step 2107, FGPGFB and FGPGPM are determined. FGPGFB is the fuel concentration GFPG learning of which has been completed through the fuel concentration learning routine illustrated in FIG. 19. FGPGPM is a value obtained by converting the fuel concentration C as pressure-derived concentration into a relative fuel concentration by the same calculation as at Step 1902 in the routine illustrated in FIG. 19.

At Step 2108, subsequently, the FGPGFB and FGPGPM determined at Step 2107 are compared with each other. Specifically, it is determined whether or not the absolute value of the difference between FGPGFB and FGPGPM is greater than a preset predetermined value. This determination is for determining whether or not FGPGFB and FGPGPM can be evaluated to be within a detection error range with the accuracy of fuel vapor concentration demanded in air-fuel ratio control taken into account. The above-mentioned predetermined value is preset from this view point.

In cases where the determination made at Step 2108 is affirmative, that is, the difference between FGPGFB and FGPGPM is greater, it is supposed that FGPGPM as pressure-derived concentration is low in reliability. At Step 2109, therefore, detection of pressure-derived concentration is prohibited and incorporation of an already detected pressure-derived concentration into control is also prohibited. Thereafter, the flow proceeds to Step 2111 to determine that the validity has been confirmed. When this routine is thereafter carried out in this case, it is determined at Step 2101 that the validity has been confirmed and this routine is immediately terminated. Therefore, detection and incorporation of pressure-derived concentration are continuously prohibited.

In cases where a negative determination is made at Step 2108, that is, the difference between FGPGFB and FGPGPM is smaller, the flow proceeds to Step 2110. In cases where the flow proceeds to Step 2110, it is supposed that FGPGPM as pressure-derived concentration is reliable. Therefore, incorporation of pressure-derived concentration prohibited at Step 2105 is permitted again. Then, the flow proceeds to Step 2111 to determine that the validity has been confirmed. In this case, a state in which detection and incorporation of pressure-derived concentration are both permitted is established.

Figure 22:
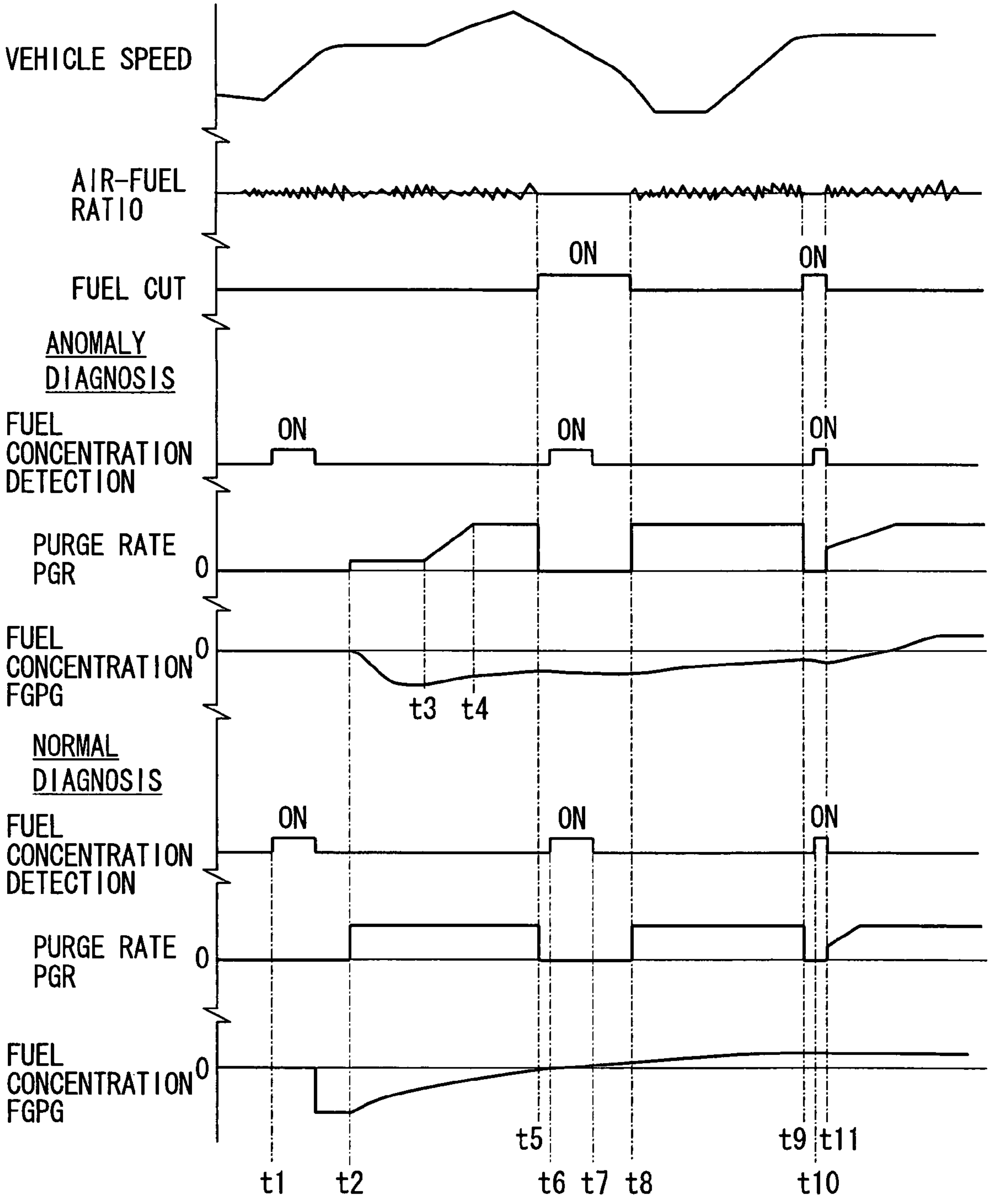
FIG. 22 is a timing diagram illustrating one embodiment of purge timing.

FIG. 22 is a timing diagram illustrating an example of purge timing in this embodiment. FIG. 22 is a timing diagram for cases where an engine is in operation. In cases where the leak check conditions are met when an engine is at a stop, the leak check control (FIG. 2) is carried out in advance. An example of a timing diagram for cases where as a result of a diagnosis, a leak hole is detected in the leak check closed space is the timing diagram in case of anomaly diagnosis, illustrated in FIG. 22. An example of a timing diagram for cases where a diagnosis result is normal is the timing diagram in case of normal diagnosis, illustrated in FIG. 22.

In case of normal diagnosis, fuel concentration detection based on pressure measurement is permitted. Therefore, a negative determination is made at Step 602 in the routine illustrated in FIG. 6. Consequently, when an affirmative determination is made at any other step in the routine illustrated in FIG. 6, for example, the ignition switch is turned on, fuel concentration detection based on pressure measurement (FIG. 7) is started (at time t1).

After the concentration detection illustrated in FIG. 7 is completed and a fuel concentration C is obtained, the fuel concentration C can be converted into a relative fuel vapor concentration, that is, fuel concentration FGPG at Step 1902 in the routine illustrated in FIG. 19. Since the pressure-derived concentration incorporation permission flag XIPRGHC is set to 1, the processing for determining a purge rate initial value of Step 10052 in the routine illustrated in FIG. 11 is carried out. For this reason, using a large purge rate PGR determined by carrying out this purge rate initial value determination processing, purging is started (at time t2).

Also, in case of anomaly diagnosis, detection of pressure-derived concentration is permitted at Step 2102 in the routine illustrated in FIG. 21, and its incorporation is temporarily permitted. For this reason, fuel concentration detection based on pressure measurement (FIG. 7) is carried out as in case of normal diagnosis (at time t1).

However, in the early stages after the engine is started, learning of fuel concentration FGPG based on the deviation of air-fuel ratio has not been completed. Therefore, a negative determination is made at Step 2106 and the processing of Step 2105 is carried out. Consequently, incorporation of pressure-derived concentration is prohibited. As a result, purging is started at so low a purge rate PGR that the air-fuel ratio is not influenced (at time t2). Then, a fuel concentration FGPG obtained when this low purge rate PGR is further increased is estimated. After estimation is completed (at time t3), learning of fuel concentration FGPG is repeated based on the expected value, and the purge valve 16 is gradually opened. The purge rate PGR reaches the maximum value at time t4. Purging can be carried out with disturbance in air-fuel ratio suppressed by taking this procedure even when a fuel concentration FGPG cannot be learned before starting purging.

When the purge rate PGR reaches the maximum value at time t4, learning of fuel concentration FGPG based on the deviation of air-fuel ratio is completed. Therefore, in cases where a leak hole has been detected, the determination made at Step 2106 in the routine illustrated in FIG. 21 is affirmative. Consequently, the flow proceeds to Steps 2107 and 2108, and FGPGFB and FGPGPM are compared with each other. Based on the result of this comparison, detection and incorporation of the pressure-derived concentration are both prohibited or both permitted.

When the vehicle speed is reduced and a fuel cut state is turned on (at time t5), the purge rate PGR is zeroed, that is, the purge valve 16 is fully closed and purging is interrupted. In case of normal diagnosis or in cases where an anomaly diagnosis is given but detection and incorporation of pressure-derived concentration are permitted, the following measure is taken: when purging is kept interrupted and a predetermined time has passed after the completion of the previous fuel concentration detection based on pressure measurement, the flow proceeds to Step 605 in the processing illustrated in FIG. 6. Therefore, fuel concentration detection based on pressure measurement is resumed (at time t6). When this fuel concentration detection is completed at time t7, the pressure-derived concentration incorporation permission flag is set to 1 at Step 1002 in the routine illustrated in FIG. 10. Then, a fuel concentration FGPG is calculated at Step 1802 in the routine illustrated in FIG. 18.

When the fuel cut state is turned off, that is, fuel cut is canceled at time t8 subsequent to time t7, the following measure is taken: since the fuel concentration FGPG has been calculated at Step 1902 in the routine illustrated in FIG. 19, purging is resumed at a high purge rate PGR from the early stages after purge resumption (at time t8).

In cases where an anomaly diagnosis is given and detection and incorporation of pressure-derived concentration are prohibited, purging is resumed at a purge rate PGR determined based on the duration of a fuel cut state though this is not shown in the drawing. Thus, purging can be resumed without disturbing the air-fuel ratio. After purging is resumed, learning of fuel concentration FGPG is repeated and further the purge rate PGR is increased.

In cases where a fuel cut state is turned on at time t9 and concentration detection based on pressure measurement is started at time t10 but this concentration detection is not completed and the fuel cut state is turned off again at time t11, the following measure is taken: even when a normal diagnosis is given, purging is resumed at a purge rate PGR determined by totalizing the durations of fuel cut state, as in case of anomaly diagnosis.

In this embodiment, as mentioned above, the fuel vapor concentration of air-fuel mixture is obtained by passing the air-fuel mixture through the air-fuel mixture circulation portion when purging is not being carried out. Therefore, purging can be started at the maximized purge rate PGR from the beginning of purging (at time t2), and further the purge rate PGR can also be maximized when purging is resumed (at time t8). Therefore, an amount of purge can be sufficiently increased.

In cases where fuel concentration detection is not completed while purging is being interrupted, a purge rate PGR at the time of purge resumption is determined based on the purge interruption time. Therefore, the purge rate PGR can be increased to some degree when purging is resumed even when fuel concentration detection is not completed while purging is being interrupted. Also, because of this, an amount of purge can be increased.

In cases where it is determined by the leak check control illustrated in FIG. 2 that there is a leak in the leak check closed space, there is the following possibility: the fuel vapor concentration C measured by passing air-fuel mixture through the air-fuel mixture circulation portion that partly overlaps the closed space formation portion that forms the leak check closed space can be low in reliability. To cope with this, the routine for determining whether to permit detection and incorporation of pressure-derived concentration (FIG. 21) is carried out to determine the reliability of the fuel vapor concentration C as pressure-derived concentration. In cases where the fuel vapor concentration C is determined to be unreliable, detection and incorporation of the pressure-derived concentration are prohibited. Then, the fuel concentration FGPG (first fuel concentration) determined based on an amount of deviation of the air-fuel ratio from the target air-fuel ratio, through the routine illustrated in FIG. 9 is used regardless of the operating state of the relevant vehicle. Therefore, the following event can also be avoided: an injection quantity is controlled based on an abnormal fuel concentration, and as a result, an air-fuel ratio is largely deviated.

In cases where the fuel vapor concentration C is determined to be reliable, detection and incorporation of pressure-derived concentration are permitted even when a leak is detected in the leak check closed space. Therefore, an amount of purge can be increased as compared with cases where use of pressure-derived concentration is prohibited whenever a leak hole is detected.

Up to this point, description has been given to a preferred embodiment of the invention. However, the invention is not limited to the above-mentioned embodiment, and it can be modified in various manners without departing from the scope of the invention.

Some examples will be taken. In the above-mentioned embodiment, the pressure sensor 24 is connected to the downstream side of the throttle 23 at one end and is open to the atmosphere at the other end. Instead, the other end may be connected to the upstream side of the throttle 23 so that the pressure difference between upstream and downstream of the throttle 23 is detected.

The above-mentioned embodiment uses the three-position valve 21. Instead, multiple two-position valves may be combined so as to perform switching operation equivalent to the above-mentioned switching operation between the first position to the third position.

While only the selected embodiments have been chosen to illustrate the present invention, it will be apparent to those skilled in the art that various changes and modifications can be made therein without departing from the scope of the disclosure as defined in the appended claims. Furthermore, the foregoing description of the embodiments herein is provided for illustration only, and not for the purpose of limiting the disclosure as defined by the appended claims and their equivalents.

What is claimed is:

1. A fuel vapor treatment system for an internal combustion engine of a vehicle having a leak check device in which a space extending from a fuel tank to a canister for temporarily adsorbing fuel vapor produced in the fuel tank to a point at which the fuel vapor is purged into an intake pipe of the internal combustion engine is defined as a leak check closed space for checking for a leak of at least a predetermined size based on change in pressure in the leak check closed space, the fuel vapor treatment system comprising:

a purge pipe for guiding fuel vapor purged from the canister into the intake pipe;

a purge control valve operatively coupled to the purge pipe for controlling the rate of a purge flow from the purge pipe to the intake pipe;

an air-fuel ratio sensor operatively coupled to an exhaust pipe of the internal combustion engine for detecting an air-fuel ratio;

a first fuel status determining device that determines the fuel status of an air-fuel mixture containing fuel vapor purged from the canister based on an amount of deviation between the air-fuel ratio detected by the air-fuel ratio sensor and a target air-fuel ratio when the purge control valve is open;

an air-fuel ratio controlling device that controls the quantity of injection into the internal combustion engine so that the air-fuel ratio becomes substantially equal to the target air-fuel ratio based on the fuel status of air-fuel mixture purged from the canister;

an air-fuel mixture circulation portion with a first component portion forming part of a closed space formation portion that forms the leak check closed space and a second component portion separate from the closed space formation portion but that communicates with the first component portion, and through which the air-fuel mixture purged from the canister can flow with the purge control valve closed;

a second fuel status determining device that purges the air-fuel mixture from the canister into the air-fuel mixture circulation portion with the purge control valve closed and thereby determines the fuel status of the air-fuel mixture; and a reliability determining device that, when the presence of a leak is detected by the leak check device, determines the reliability of the fuel status determined by the second fuel status determining device based on a comparison of the fuel status of air-fuel mixture determined by the first fuel status determining device and the fuel status of air-fuel mixture determined by the second fuel status determining device, wherein when a leak is not detected by the leak check device and when a leak is detected but it is determined by the reliability determining device that the fuel status determined by the second fuel status determining device is reliable, the air-fuel ratio controlling device switches which to use, the fuel status determined by the first fuel status determining device or the fuel status determined by the second fuel status determining device, based on the operating state of the relevant vehicle, and when it is determined by the reliability determining device that the fuel status determined by the second fuel status determining device is unreliable, the air-fuel ratio controlling device uses the fuel status determined by the first fuel status determining device for the fuel status for controlling the injection quantity regardless of the operating state of the vehicle.

2. The fuel vapor treatment system of claim 1, wherein when a leak is detected by the leak check device and reliability determination has not been carried out by the reliability determining device, the air-fuel ratio controlling device uses the fuel status determined by the first fuel status determining device for the fuel status for controlling the injection quantity regardless of the operating state of the vehicle.

3. The fuel vapor treatment system of claim 1, wherein the leak check device includes:

a leak check passage that is open to the atmosphere and is provided with a reference throttle;

a pressure applying device that pressurizes or depressurizes the leak check closed space and the interior of the leak check passage;

a pressure measuring device that measures the pressure in the leak check closed space or the leak check passage increased or decreased by the pressure applying device;

a pressure application range switching device that switches the pressure application range pressurized or depressurized by the pressure applying device between two different leak measurement states in which at least either of the leak check closed space and the interior of the leak check passage is included and which are different from each other in the pressure application range; and a leak determining device that determines the presence or absence of the leak based on the comparison of a plurality of pressures respectively measured by the pressure measuring device in the plurality of different leak measurement states.

4. The fuel vapor treatment system of claim 1, wherein the air-fuel mixture circulation portion further comprises:

a branch pipe branched from the purge pipe and the portion of the purge pipe extending from the canister to the branch pipe as a first component portion; and a measurement passage that can be connected to and disconnected from the branch pipe by a switching valve and has a throttle at some midpoint as a second component portion, and wherein the closed space formation portion includes the fuel tank, a vapor introducing pipe for introducing fuel vapor from the fuel tank into the canister, the canister, the purge pipe, and the branch pipe.

5. The fuel vapor treatment system of claim 1, wherein when the presence of the leak is not detected by the leak check device and the operating state of the vehicle is such that purging has not yet been started, the air-fuel ratio controlling device determines an injection quantity at start of purging using the fuel status determined by the second fuel status determining device.

6. The fuel vapor treatment system of claim 1, wherein when the operating state of the vehicle is such that purging has been started and is not being interrupted, the air-fuel ratio controlling device uses the fuel status determined by the first fuel status determining device.

7. The fuel vapor treatment system of claim 1, wherein when the leak is not detected by the leak check device and the operating state of the vehicle is such that purging is being interrupted, the air-fuel ratio controlling device determines an injection quantity at resumption of purging using the fuel status determined by the second fuel status determining device.

8. The fuel vapor treatment system of claim 7, wherein when the operating state of the vehicle is such that purging is being interrupted and the determination of fuel status by the second fuel status determining device has not been completed, the air-fuel ratio controlling device uses the fuel status determined by the first fuel status determining device immediately before purging is interrupted.

9. The fuel vapor treatment system of claim 1, wherein when the presence of a leak is detected by the leak check device but it is determined by the reliability determining device that the fuel status determined by the second fuel status determining device is reliable and the operating state of the vehicle is such that purging is being interrupted, the air-fuel ratio controlling device determines an injection quantity at resumption of purging using the fuel status determined by the second fuel status determining device.

* * * * *